US011820255B2

(12) United States Patent
Rajaie et al.

(10) Patent No.: US 11,820,255 B2
(45) Date of Patent: Nov. 21, 2023

(54) PREDICTIVE REGENERATIVE BRAKING

(71) Applicant: NIO Technology (Anhui) Co., Ltd., Hefei (CN)

(72) Inventors: Rick Rajaie, Rochester Hills, MI (US); Joshua Smith, Los Gatos, CA (US); Jamie P. Carlson, San Jose, CA (US)

(73) Assignee: NIO Technology (Anhui) Co., Ltd., Hefel (CN)

( * ) Notice: Subject to any disclaimer, the term of this patent is extended or adjusted under 35 U.S.C. 154(b) by 359 days.

(21) Appl. No.: 16/780,129

(22) Filed: Feb. 3, 2020

(65) Prior Publication Data
US 2021/0237581 A1 Aug. 5, 2021

(51) Int. Cl.
*B60L 7/18* (2006.01)
*B60T 7/12* (2006.01)
*B60T 1/10* (2006.01)

(52) U.S. Cl.
CPC .............. *B60L 7/18* (2013.01); *B60T 1/10* (2013.01); *B60T 7/12* (2013.01); *B60L 2240/10* (2013.01);
(Continued)

(58) Field of Classification Search
CPC .... B60L 7/18; B60L 2240/10; B60L 2240/62; B60L 2240/64; B60L 2240/66;
(Continued)

(56) References Cited

U.S. PATENT DOCUMENTS

| 5,941,328 A | 8/1999 | Lyons et al. |
| 9,296,301 B2 | 3/2016 | Li |

(Continued)

FOREIGN PATENT DOCUMENTS

KR 20140072267 A * 6/2014

OTHER PUBLICATIONS

International Search Report and Written Opinion for International (PCT) Patent Application No. PCT/US2021/015653, dated Apr. 21, 2021 7 pages.
(Continued)

*Primary Examiner* — James M McPherson
*Assistant Examiner* — Kyle J Kingsland
(74) *Attorney, Agent, or Firm* — Sheridan Ross, PC

(57) ABSTRACT

Systems and methods are directed to dynamically and automatically adjusting a standard regenerative braking intensity. Roadway data, data from one or more sensors of a vehicle and data including parameter values for operating states of the vehicle regarding a roadway from a route being navigated by the vehicle are received by a processor of a control system of the vehicle. Standard regenerative braking intensity values based on a vehicle's acceleration is retrieved from memory. Adjusted regenerative braking intensity values are calculated based on at least one of the roadway data, the sensor data and the parameter values of the operating states of the vehicle and the standard regenerative braking intensity values. The adjusted regenerative braking intensity values are transmitted to the control system and an acceleration or deacceleration amount is applied to the vehicle based on the adjusted regenerative braking intensity values.

20 Claims, 10 Drawing Sheets

(52) U.S. Cl.
CPC ....... *B60L 2240/62* (2013.01); *B60L 2240/64* (2013.01); *B60L 2240/66* (2013.01); *B60L 2240/68* (2013.01); *B60L 2240/70* (2013.01); *B60L 2250/16* (2013.01); *B60T 2210/10* (2013.01); *B60T 2210/30* (2013.01); *B60T 2210/32* (2013.01); *B60T 2250/00* (2013.01); *B60T 2270/60* (2013.01)

(58) Field of Classification Search
CPC ............. B60L 2240/68; B60L 2240/70; B60L 2250/16; B60T 1/10; B60T 7/12; B60T 2210/10; B60T 2210/30; B60T 2210/32; B60T 2250/00; B60T 2270/60
See application file for complete search history.

(56) References Cited

U.S. PATENT DOCUMENTS

| | | | | |
|---|---|---|---|---|
| 2012/0053804 | A1* | 3/2012 | Saida | B60L 7/10 701/70 |
| 2014/0336893 | A1* | 11/2014 | Ideshio | B60K 6/445 701/70 |
| 2015/0019058 | A1 | 1/2015 | Georgiev | |
| 2018/0154875 | A1 | 6/2018 | Takahashi et al. | |
| 2018/0201273 | A1* | 7/2018 | Xiao | B60W 30/18154 |
| 2018/0203443 | A1* | 7/2018 | Newman | B60L 1/00 |
| 2019/0265884 | A1* | 8/2019 | Penilla | H04L 67/303 |
| 2019/0294173 | A1 | 9/2019 | Szubbocsev | |
| 2020/0055402 | A1* | 2/2020 | Camhi | B60W 30/18127 |
| 2020/0376927 | A1* | 12/2020 | Rajaie | B60H 1/0073 |
| 2021/0129678 | A1* | 5/2021 | Barker | B60W 20/00 |

OTHER PUBLICATIONS

U.S. Appl. No. 12/348,383, filed Jan. 5, 2009, Sivasubramaniam et al.

International Preliminary Report on Patentability for International (PCT) Patent Application No. PCT/US2021/015653, dated Aug. 18, 2022 5 pages.

* cited by examiner

PREDICTIVE REGENERATIVE BRAKING

FIELD

The present disclosure is generally directed to systems and methods for regenerative braking and more particularly to systems and methods for optimizing the amount of regenerative braking based on static and dynamic factors.

BACKGROUND

Regenerative braking is used in vehicles that make use of electric motors, primarily fully electric vehicles and hybrid electric vehicles. With regenerative braking, electrical energy generated can be fed into a charging system for the car's batteries. Currently, the regenerative braking intensity has a standard value which is fixed to a certain acceleration, resulting in a different feel, depending on driving speed and different system level effects. Many vehicles have the ability to dynamically change the level of regenerative braking below a determined maximum that is safe across all conditions. Hence, there is a need for dynamically and automatically changing a standard regenerative braking intensity value based on factors other than the speed at which the vehicle is traveling.

DETAILED DESCRIPTION

Embodiments of the present disclosure will be described in connection with a vehicle, and in some embodiments, an electric vehicle, rechargeable electric vehicle, and/or hybrid-electric vehicle and associated systems.

The following detailed description refers to the accompanying drawings. The same reference number in different drawings may identify the same or similar elements.

Figure 1:
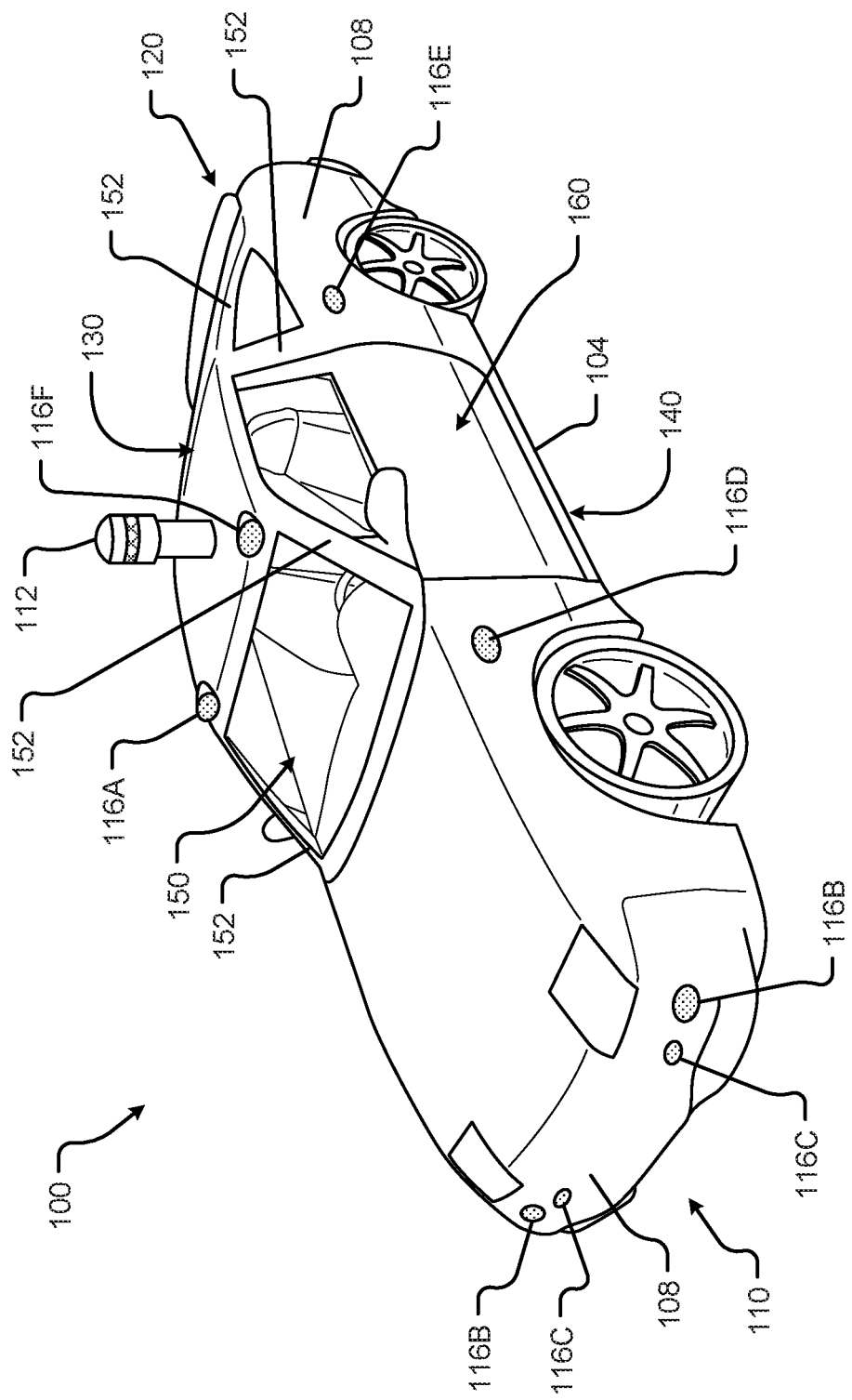
FIG. 1 shows a vehicle in accordance with embodiments of the present disclosure.

FIG. 1 shows a perspective view of a vehicle 100 in accordance with embodiments of the present disclosure. The electric vehicle 100 comprises a vehicle front 110, vehicle aft or rear 120, vehicle roof 130, at least one vehicle side 160, a vehicle undercarriage 140, and a vehicle interior 150. In any event, the vehicle 100 may include a frame 104 and one or more body panels 108 mounted or affixed thereto. The vehicle 100 may include one or more interior components (e.g., components inside an interior space 150, or user space, of a vehicle 100, etc.), exterior components (e.g., components outside of the interior space 150, or user space, of a vehicle 100, etc.), drive systems, controls systems, structural components, etc.

Although shown in the form of a car, it should be appreciated that the vehicle 100 described herein may include any conveyance or model of a conveyance, where the conveyance was designed for the purpose of moving one or more tangible objects, such as people, animals, cargo, and the like. The term "vehicle" does not require that a conveyance moves or is capable of movement. Typical vehicles may include but are in no way limited to cars, trucks, motorcycles, busses, automobiles, trains, railed conveyances, boats, ships, marine conveyances, submarine conveyances, airplanes, space craft, flying machines, human-powered conveyances, and the like.

In some embodiments, the vehicle 100 may include a number of sensors, devices, and/or systems that are capable of assisting in driving operations, e.g., autonomous or semi-autonomous control. Examples of the various sensors and systems may include, but are in no way limited to, one or more of cameras (e.g., independent, stereo, combined image, etc.), infrared (IR) sensors, radio frequency (RF) sensors, ultrasonic sensors (e.g., transducers, transceivers, etc.), RADAR sensors (e.g., object-detection sensors and/or systems), LIDAR (Light Imaging, Detection, And Ranging) systems, odometry sensors and/or devices (e.g., encoders, etc.), orientation sensors (e.g., accelerometers, gyroscopes, magnetometer, etc.), navigation sensors and systems (e.g., GPS, etc.), and other ranging, imaging, and/or object-detecting sensors. The sensors may be disposed in an interior space 150 of the vehicle 100 and/or on an outside 152 of the vehicle 100. In some embodiments, the sensors and systems may be disposed in one or more portions of a vehicle 100 (e.g., the frame 104, a body panel 108, a compartment, etc.).

The vehicle sensors and systems may be selected and/or configured to suit a level of operation associated with the vehicle 100. Among other things, the number of sensors used in a system may be altered to increase or decrease information available to a vehicle control system (e.g., affecting control capabilities of the vehicle 100). Additionally, or alternatively, the sensors and systems may be part of one or more advanced driver assistance systems (ADAS) associated with a vehicle 100. In any event, the sensors and systems may be used to provide driving assistance at any level of operation (e.g., from fully-manual to fully-autonomous operations, etc.) as described herein.

The various levels of vehicle control and/or operation can be described as corresponding to a level of autonomy associated with a vehicle 100 for vehicle driving operations. For instance, at Level 0, or fully-manual driving operations, a driver (e.g., a human driver) may be responsible for all the driving control operations (e.g., steering, accelerating, braking, etc.) associated with the vehicle. Level 0 may be referred to as a "No Automation" level. At Level 1, the vehicle may be responsible for a limited number of the driving operations associated with the vehicle, while the driver is still responsible for most driving control operations. An example of a Level 1 vehicle may include a vehicle in which the throttle control and/or braking operations may be controlled by the vehicle (e.g., cruise control operations, etc.). Level 1 may be referred to as a "Driver Assistance" level. At Level 2, the vehicle may collect information (e.g., via one or more driving assistance systems, sensors, etc.) about an environment of the vehicle (e.g., surrounding area, roadway, traffic, ambient conditions, etc.) and use the collected information to control driving operations (e.g., steering, accelerating, braking, etc.) associated with the vehicle. In a Level 2 autonomous vehicle, the driver may be required to perform other aspects of driving operations not controlled by the vehicle. Level 2 may be referred to as a "Partial Automation" level. It should be appreciated that Levels 0-2 all involve the driver monitoring the driving operations of the vehicle.

At Level 3, the driver may be separated from controlling all the driving operations of the vehicle except when the vehicle makes a request for the operator to act or intervene in controlling one or more driving operations. In other words, the driver may be separated from controlling the vehicle unless the driver is required to take over for the vehicle. Level 3 may be referred to as a "Conditional Automation" level. At Level 4, the driver may be separated from controlling all the driving operations of the vehicle and the vehicle may control driving operations even when a user fails to respond to a request to intervene. Level 4 may be referred to as a "High Automation" level. At Level 5, the vehicle can control all the driving operations associated with the vehicle in all driving modes. The vehicle in Level 5 may continually monitor traffic, vehicular, roadway, and/or environmental conditions while driving the vehicle. In Level 5, there is no human driver interaction required in any driving mode. Accordingly, Level 5 may be referred to as a "Full Automation" level. It should be appreciated that in Levels 3-5 the vehicle, and/or one or more automated driving systems associated with the vehicle, monitors the driving operations of the vehicle and the driving environment.

As shown in FIG. 1, the vehicle 100 may, for example, include at least one of a ranging and imaging system 112 (e.g., LIDAR, etc.), an imaging sensor 116A, 116F (e.g., camera, IR, etc.), a radio object-detection and ranging system sensors 116B (e.g., RADAR, RF, etc.), ultrasonic sensors 116C, and/or other object-detection sensors 116D, 116E. In some embodiments, the LIDAR system 112 and/or sensors may be mounted on a roof 130 of the vehicle 100. In one embodiment, the RADAR sensors 116B may be disposed at least at a front 110, aft 120, or side 160 of the vehicle 100. Among other things, the RADAR sensors may be used to monitor and/or detect a position of other vehicles, pedestrians, and/or other objects near, or proximal to, the vehicle 100. While shown associated with one or more areas of a vehicle 100, it should be appreciated that any of the sensors and systems 116A-K, 112 illustrated in FIGS. 1 and 2 may be disposed in, on, and/or about the vehicle 100 in any position, area, and/or zone of the vehicle 100.

Figure 2:
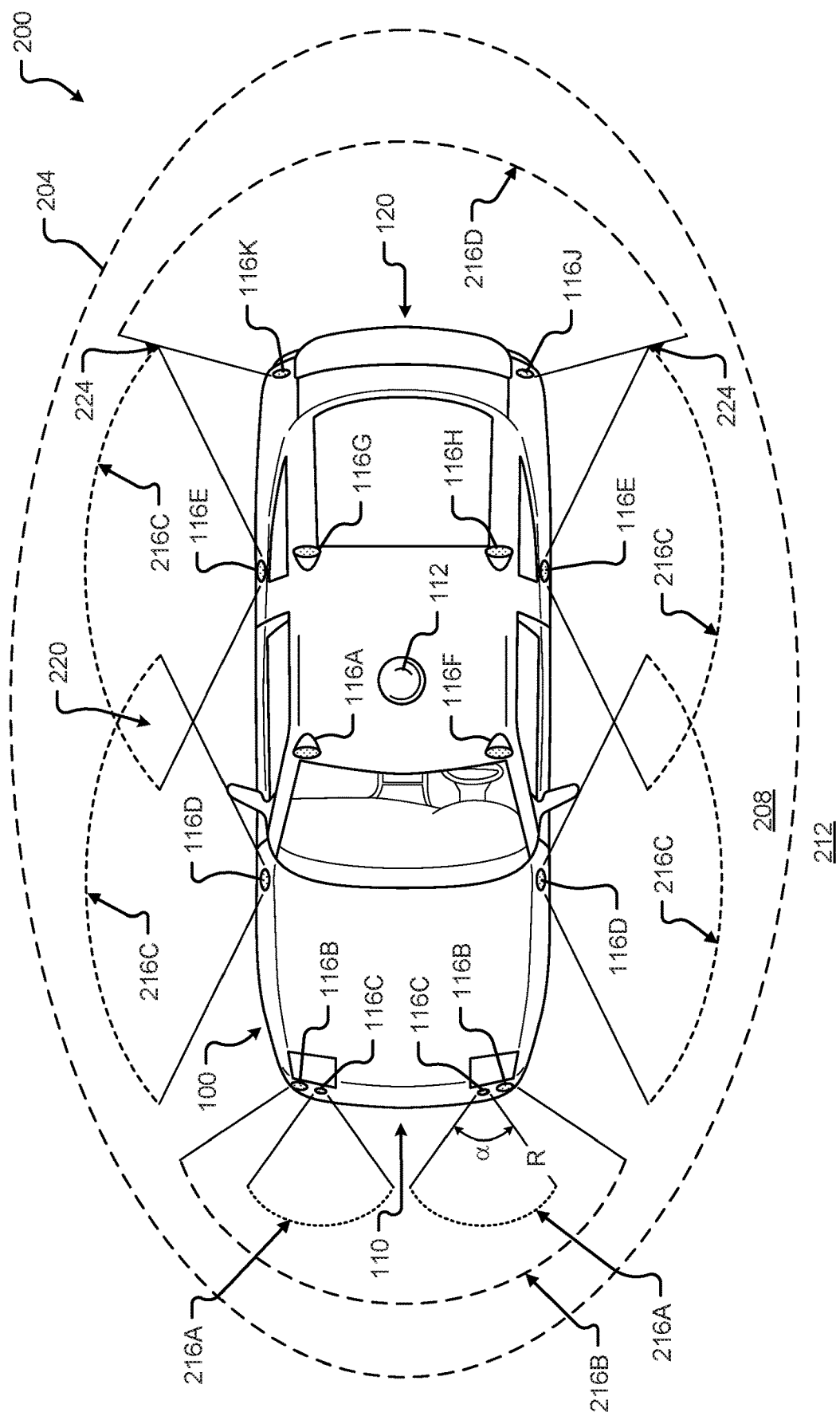
FIG. 2 shows a plan view of the vehicle in accordance with at least some embodiments of the present disclosure.

Referring now to FIG. 2, a plan view of a vehicle 100 will be described in accordance with embodiments of the present disclosure. In particular, FIG. 2 shows a vehicle sensing environment 200 at least partially defined by the sensors and systems 116A-K, 112 disposed in, on, and/or about the vehicle 100. Each sensor 116A-K may include an operational detection range R and operational detection angle. The operational detection range R may define the effective detection limit, or distance, of the sensor 116A-K. In some cases, this effective detection limit may be defined as a distance from a portion of the sensor 116A-K (e.g., a lens, sensing surface, etc.) to a point in space offset from the sensor 116A-K. The effective detection limit may define a distance, beyond which, the sensing capabilities of the sensor 116A-K deteriorate, fail to work, or are unreliable. In some embodiments, the effective detection limit may define a distance, within which, the sensing capabilities of the sensor 116A-K are able to provide accurate and/or reliable detection information. The operational detection angle may define at least one angle of a span, or between horizontal and/or vertical limits, of a sensor 116A-K. As can be appreciated, the operational detection limit and the operational detection angle of a sensor 116A-K together may define the effective detection zone 216A-D (e.g., the effective detection area, and/or volume, etc.) of a sensor 116A-K.

In some embodiments, the vehicle 100 may include a ranging and imaging system 112 such as LIDAR, or the like. The ranging and imaging system 112 may be configured to detect visual information in an environment surrounding the vehicle 100. The visual information detected in the environment surrounding the ranging and imaging system 112 may be processed (e.g., via one or more sensor and/or system processors, etc.) to generate a complete 360-degree view of an environment 200 around the vehicle. The ranging and imaging system 112 may be configured to generate changing 360-degree views of the environment 200 in real-time, for instance, as the vehicle 100 drives. In some cases, the ranging and imaging system 112 may have an effective detection limit 204 that is some distance from the center of the vehicle 100 outward over 360 degrees. The effective detection limit 204 of the ranging and imaging system 112 defines a view zone 208 (e.g., an area and/or volume, etc.) surrounding the vehicle 100. Any object falling outside of the view zone 208 is in the undetected zone 212 and would not be detected by the ranging and imaging system 112 of the vehicle 100.

Sensor data and information may be collected by one or more sensors or systems 116A-K, 112 of the vehicle 100 monitoring the vehicle sensing environment 200. This information may be processed (e.g., via a processor, computer-vision system, etc.) to determine targets (e.g., objects, signs, people, markings, roadways, conditions, etc.) inside one or more detection zones 208, 216A-D associated with the vehicle sensing environment 200. In some cases, information from multiple sensors 116A-K may be processed to form composite sensor detection information. For example, a first sensor 116A and a second sensor 116F may correspond to a first camera 116A and a second camera 116F aimed in a forward traveling direction of the vehicle 100. In this example, images collected by the cameras 116A, 116F may be combined to form stereo image information. This composite information may increase the capabilities of a single sensor in the one or more sensors 116A-K by, for example, adding the ability to determine depth associated with targets in the one or more detection zones 208, 216A-D. Similar image data may be collected by rear view cameras (e.g., sensors 116G, 116H) aimed in a rearward traveling direction vehicle 100.

In some embodiments, multiple sensors 116A-K may be effectively joined to increase a sensing zone and provide increased sensing coverage. For instance, multiple RADAR sensors 116B disposed on the front 110 of the vehicle may be joined to provide a zone 216B of coverage that spans across an entirety of the front 110 of the vehicle. In some cases, the multiple RADAR sensors 116B may cover a detection zone 216B that includes one or more other sensor detection zones 216A. These overlapping detection zones may provide redundant sensing, enhanced sensing, and/or provide greater detail in sensing within a particular portion (e.g., zone 216A) of a larger zone (e.g., zone 216B). Additionally, or alternatively, the sensors 116A-K of the vehicle 100 may be arranged to create a complete coverage, via one or more sensing zones 208, 216A-D around the vehicle 100. In some areas, the sensing zones 216C of two or more sensors 116D, 116E may intersect at an overlap zone 220. In some areas, the angle and/or detection limit of two or more sensing zones 216C, 216D (e.g., of two or more sensors 116E, 116J, 116K) may meet at a virtual intersection point 224.

The vehicle 100 may include a number of sensors 116E, 116G, 116H, 116J, 116K disposed proximal to the rear 120 of the vehicle 100. These sensors can include, but are in no way limited to, an imaging sensor, camera, IR, a radio object-detection and ranging sensors, RADAR, RF, ultrasonic sensors, and/or other object-detection sensors. Among other things, these sensors 116E, 116G, 116H, 116J, 116K may detect targets near or approaching the rear of the vehicle 100. For example, another vehicle approaching the rear 120 of the vehicle 100 may be detected by one or more of the ranging and imaging system (e.g., LIDAR) 112, rear-view cameras 116G, 116H, and/or rear facing RADAR sensors 116J, 116K. As described above, the images from the rear-view cameras 116G, 116H may be processed to generate a stereo view (e.g., providing depth associated with an object or environment, etc.) for targets visible to both cameras 116G, 116H. As another example, the vehicle 100 may be driving and one or more of the ranging and imaging system 112, front-facing cameras 116A, 116F, front-facing RADAR sensors 116B, and/or ultrasonic sensors 116C may detect targets in front of the vehicle 100. This approach may provide critical sensor information to a vehicle control system in at least one of the autonomous driving levels described above. For instance, when the vehicle 100 is driving autonomously (e.g., Level 3, Level 4, or Level 5) and detects other vehicles stopped in a travel path, the sensor detection information may be sent to the vehicle control system of the vehicle 100 to control a driving operation (e.g., braking, decelerating, etc.) associated with the vehicle 100 (in this example, slowing the vehicle 100 as to avoid colliding with the stopped other vehicles). As yet another example, the vehicle 100 may be operating and one or more of the ranging and imaging system 112, and/or the side-facing sensors 116D, 116E (e.g., RADAR, ultrasonic, camera, combinations thereof, and/or other type of sensor), may detect targets at a side of the vehicle 100. It should be appreciated that the sensors 116A-K may detect a target that is both at a side 160 and a front 110 of the vehicle 100 (e.g., disposed at a diagonal angle to a centerline of the vehicle 100 running from the front 110 of the vehicle 100 to the rear 120 of the vehicle). Additionally, or alternatively, the sensors 116A-K may detect a target that is both, or simultaneously, at a side 160 and a rear 120 of the vehicle 100 (e.g., disposed at a diagonal angle to the centerline of the vehicle 100).

Figure 3A:
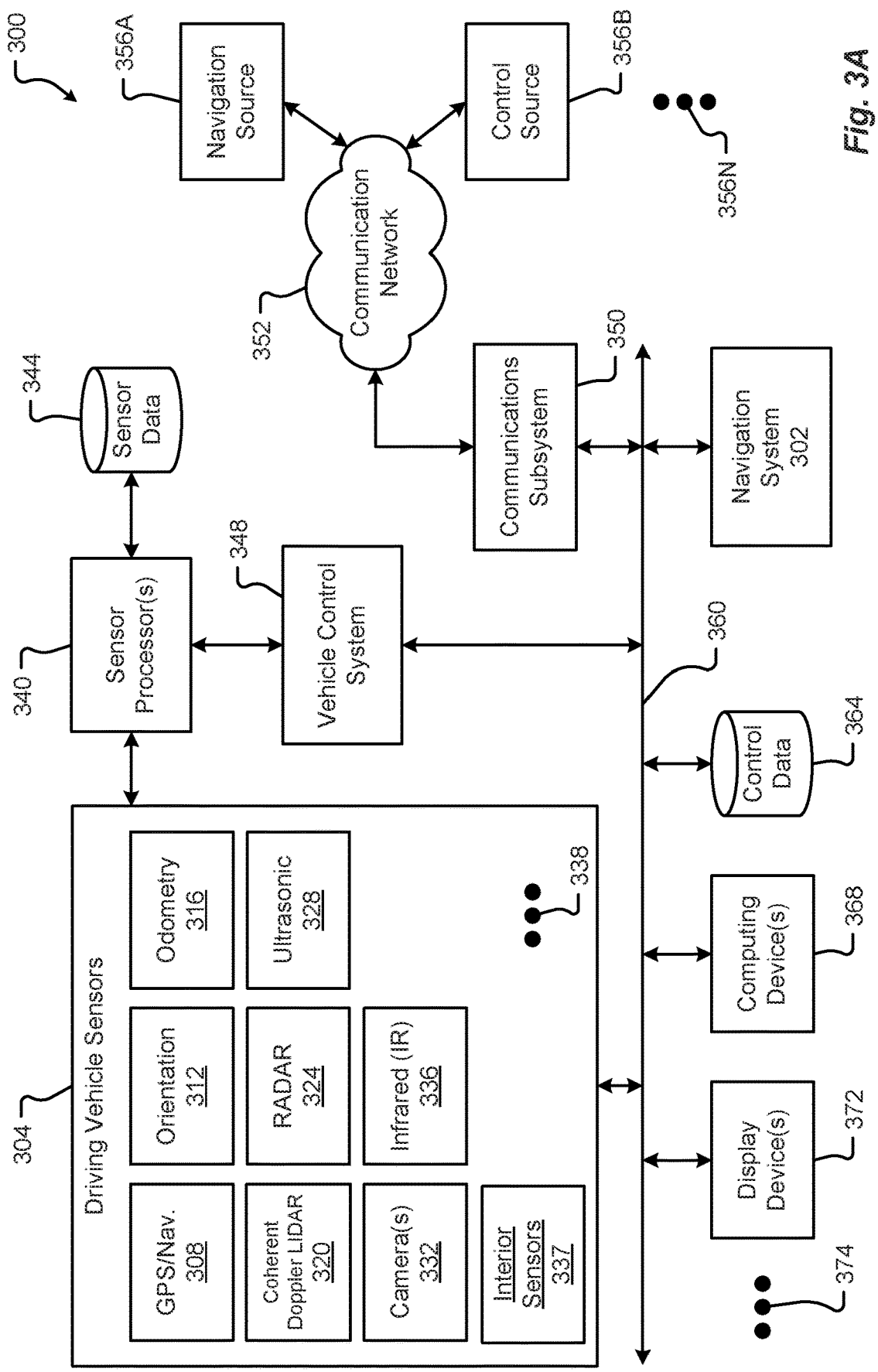
FIG. 3A is a block diagram of an embodiment of a communication environment of the vehicle in accordance with embodiments of the present disclosure.
Figure 3B:
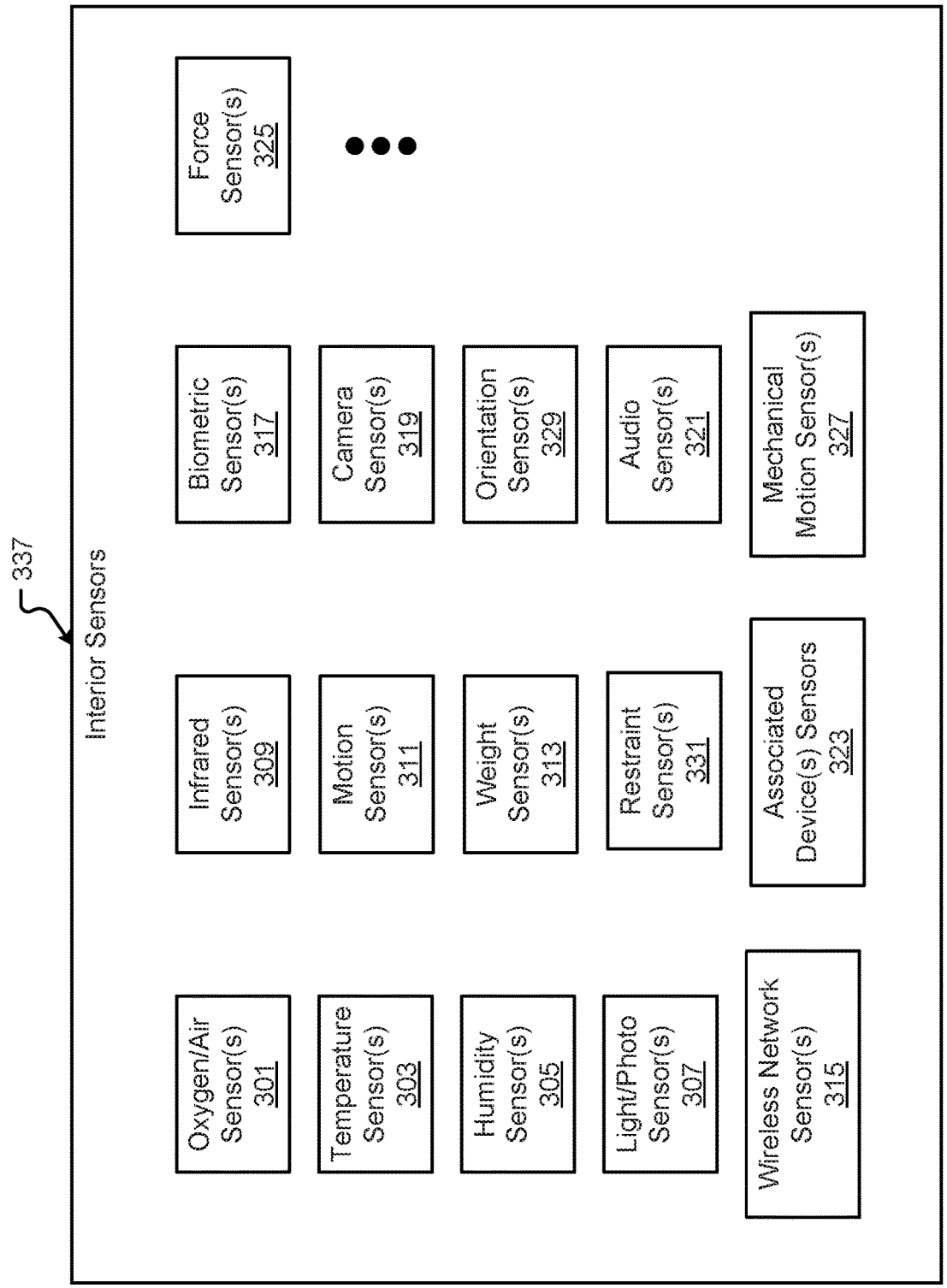
FIG. 3B is a block diagram of an embodiment of interior sensors within the vehicle in accordance with embodiments of the present disclosure.
Figure 3C:
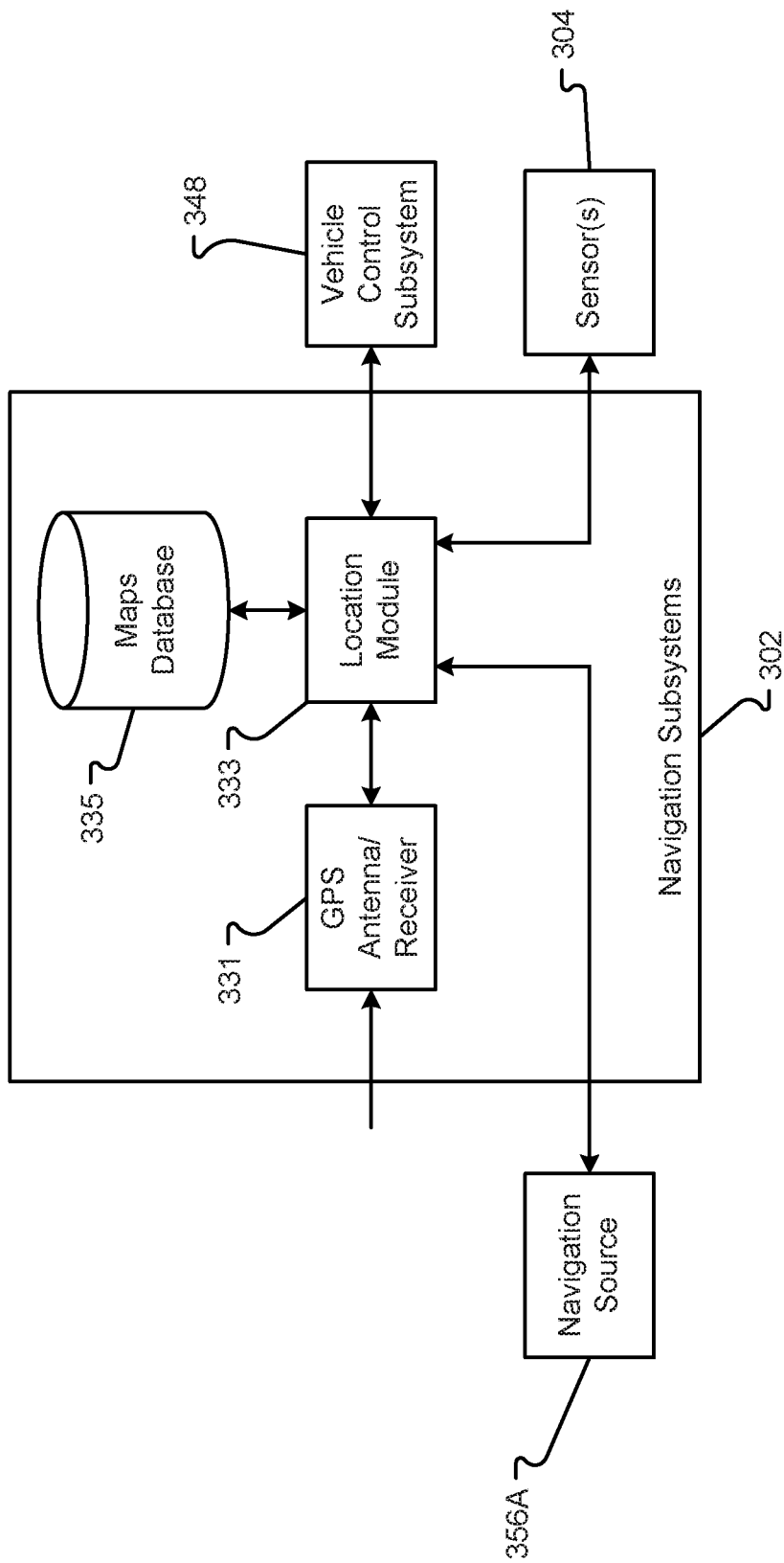
FIG. 3C is a block diagram of an embodiment of a navigation system of the vehicle in accordance with embodiments of the present disclosure.

FIGS. 3A-3C are block diagrams of an embodiment of a communication environment 300 of the vehicle 100 in accordance with embodiments of the present disclosure. The communication system 300 may include one or more vehicle driving vehicle sensors and systems 304, sensor processors 340, sensor data memory 344, vehicle control system 348, communications subsystem 350, control data 364, computing devices 368, display devices 372, and other components 374 that may be associated with a vehicle 100. These associated components may be electrically and/or communicatively coupled to one another via at least one bus 360. In some embodiments, the one or more associated components may send and/or receive signals across a communication network 352 to at least one of a navigation source 356A, a control source 356B, or some other entity 356N.

In accordance with at least some embodiments of the present disclosure, the communication network 352 may comprise any type of known communication medium or collection of communication media and may use any type of protocols, such as SIP, TCP/IP, SNA, IPX, AppleTalk, and the like, to transport messages between endpoints. The communication network 352 may include wired and/or wireless communication technologies. The Internet is an example of the communication network 352 that constitutes an Internet Protocol (IP) network consisting of many computers, computing networks, and other communication devices located all over the world, which are connected through many telephone systems and other means. Other examples of the communication network 352 include, without limitation, a standard Plain Old Telephone System (POTS), an Integrated Services Digital Network (ISDN), the Public Switched Telephone Network (PSTN), a Local Area Network (LAN), such as an Ethernet network, a Token-Ring network and/or the like, a Wide Area Network (WAN), a virtual network, including without limitation a virtual private network ("VPN"); the Internet, an intranet, an extranet, a cellular network, an infra-red network; a wireless network (e.g., a network operating under any of the IEEE 802.9 suite of protocols, the Bluetooth® protocol known in the art, and/or any other wireless protocol), and any other type of packet-switched or circuit-switched network known in the art and/or any combination of these and/or other networks. In addition, it can be appreciated that the communication network 352 need not be limited to any one network type, and instead may be comprised of a number of different networks and/or network types. The communication network 352 may comprise a number of different communication media such as coaxial cable, copper cable/wire, fiber-optic cable, antennas for transmitting/receiving wireless messages, and combinations thereof.

The driving vehicle sensors and systems 304 may include at least one navigation 308 (e.g., global positioning system (GPS), etc.), orientation 312, odometry 316, LIDAR 320, RADAR 324, ultrasonic 328, camera 332, infrared (IR) 336, and/or other sensor or system 338. These driving vehicle sensors and systems 304 may be similar, if not identical, to the sensors and systems 116A-K, 112 described in conjunction with FIGS. 1 and 2.

The navigation sensor 308 may include one or more sensors having receivers and antennas that are configured to utilize a satellite-based navigation system including a network of navigation satellites capable of providing geolocation and time information to at least one component of the vehicle 100. Examples of the navigation sensor 308 as described herein may include, but are not limited to, at least one of Garmin® GLO™ family of GPS and GLONASS combination sensors, Garmin® GPS 15x™ family of sensors, Garmin® GPS 16x™ family of sensors with high-sensitivity receiver and antenna, Garmin® GPS 18x OEM family of high-sensitivity GPS sensors, Dewetron DEWE-VGPS series of GPS sensors, GlobalSat 1-Hz series of GPS sensors, other industry-equivalent navigation sensors and/or systems, and may perform navigational and/or geolocation functions using any known or future-developed standard and/or architecture.

The orientation sensor 312 may include one or more sensors configured to determine an orientation of the vehicle 100 relative to at least one reference point. In some embodiments, the orientation sensor 312 may include at least one pressure transducer, stress/strain gauge, accelerometer, gyroscope, and/or geomagnetic sensor. Examples of the navigation sensor 308 as described herein may include, but are not limited to, at least one of Bosch Sensortec BMX 160 series low-power absolute orientation sensors, Bosch Sensortec BMX055 9-axis sensors, Bosch Sensortec BMI055 6-axis inertial sensors, Bosch Sensortec BMI160 6-axis inertial sensors, Bosch Sensortec BMF055 9-axis inertial sensors (accelerometer, gyroscope, and magnetometer) with integrated Cortex M0+ microcontroller, Bosch Sensortec BMP280 absolute barometric pressure sensors, Infineon TLV493D-A1B6 3D magnetic sensors, Infineon TLI493D-W1B6 3D magnetic sensors, Infineon TL family of 3D magnetic sensors, Murata Electronics SCC2000 series combined gyro sensor and accelerometer, Murata Electronics SCC1300 series combined gyro sensor and accelerometer, other industry-equivalent orientation sensors and/or systems, which may perform orientation detection and/or determination functions using any known or future-developed standard and/or architecture.

The odometry sensor and/or system 316 may include one or more components that is configured to determine a change in position of the vehicle 100 over time. In some embodiments, the odometry system 316 may utilize data from one or more other sensors and/or systems 304 in determining a position (e.g., distance, location, etc.) of the vehicle 100 relative to a previously measured position for the vehicle 100. Additionally or alternatively, the odometry sensors 316 may include one or more encoders, Hall speed sensors, and/or other measurement sensors/devices configured to measure a wheel speed, rotation, and/or number of revolutions made over time. Examples of the odometry sensor/system 316 as described herein may include, but are not limited to, at least one of Infineon TLE4924/26/27/28C high-performance speed sensors, Infineon TL4941plusC(B) single chip differential Hall wheel-speed sensors, Infineon TL5041plusC Giant Magnetoresistance (GMR) effect sensors, Infineon TL family of magnetic sensors, EPC Model 25SP Accu-CoderPro™ incremental shaft encoders, EPC Model 30M compact incremental encoders with advanced magnetic sensing and signal processing technology, EPC Model 925 absolute shaft encoders, EPC Model 958 absolute shaft encoders, EPC Model MA36S/MA63S/SA36S absolute shaft encoders, Dynapar™ F18 commutating optical encoder, Dynapar™ HS35R family of phased array encoder sensors, other industry-equivalent odometry sensors and/or systems, and may perform change in position detection and/or determination functions using any known or future-developed standard and/or architecture.

The LIDAR sensor/system 320 may include one or more components configured to measure distances to targets using laser illumination. In some embodiments, the LIDAR sensor/system 320 may provide 3D imaging data of an environment around the vehicle 100. The imaging data may be processed to generate a full 360-degree view of the environment around the vehicle 100. The LIDAR sensor/system 320 may include a laser light generator configured to generate a plurality of target illumination laser beams (e.g., laser light channels). In some embodiments, this plurality of laser beams may be aimed at, or directed to, a rotating reflective surface (e.g., a mirror) and guided outwardly from the LIDAR sensor/system 320 into a measurement environment. The rotating reflective surface may be configured to continually rotate 360 degrees about an axis, such that the plurality of laser beams is directed in a full 360-degree range around the vehicle 100. A photodiode receiver of the LIDAR sensor/system 320 may detect when light from the plurality of laser beams emitted into the measurement environment returns (e.g., reflected echo) to the LIDAR sensor/system 320. The LIDAR sensor/system 320 may calculate, based on a time associated with the emission of light to the detected return of light, a distance from the vehicle 100 to the illuminated target. In some embodiments, the LIDAR sensor/system 320 may generate over 2.0 million points per second and have an effective operational range of at least 100 meters. Examples of the LIDAR sensor/system 320 as described herein may include, but are not limited to, at least one of Velodyne® LiDAR™ HDL-64E 64-channel LIDAR sensors, Velodyne® LiDAR™ HDL-32E 32-channel LIDAR sensors, Velodyne® LiDAR™ PUCK™ VLP-16 16-channel LIDAR sensors, Leica Geosystems Pegasus: Two mobile sensor platform, Garmin® LIDAR-Lite v3 measurement sensor, Quanergy M8 LiDAR sensors, Quanergy S3 solid state LiDAR sensor, LeddarTech® LeddarVU compact solid state fixed-beam LIDAR sensors, other industry-equivalent LIDAR sensors and/or systems, and may perform illuminated target and/or obstacle detection in an environment around the vehicle 100 using any known or future-developed standard and/or architecture.

The RADAR sensors 324 may include one or more radio components that are configured to detect objects/targets in an environment of the vehicle 100. In some embodiments, the RADAR sensors 324 may determine a distance, position, and/or movement vector (e.g., angle, speed, etc.) associated with a target over time. The RADAR sensors 324 may include a transmitter configured to generate and emit electromagnetic waves (e.g., radio, microwaves, etc.) and a receiver configured to detect returned electromagnetic waves. In some embodiments, the RADAR sensors 324 may include at least one processor configured to interpret the returned electromagnetic waves and determine locational properties of targets. Examples of the RADAR sensors 324 as described herein may include, but are not limited to, at least one of Infineon RASIC™ RTN7735PL transmitter and RRN7745PL/46PL receiver sensors, Autoliv ASP Vehicle RADAR sensors, Delphi L2C0051TR 77 GHz ESR Electronically Scanning Radar sensors, Fujitsu Ten Ltd. Automotive Compact 77 GHz 3D Electronic Scan Millimeter Wave Radar sensors, other industry-equivalent RADAR sensors and/or systems, and may perform radio target and/or obstacle detection in an environment around the vehicle 100 using any known or future-developed standard and/or architecture.

The ultrasonic sensors 328 may include one or more components that are configured to detect objects/targets in an environment of the vehicle 100. In some embodiments, the ultrasonic sensors 328 may determine a distance, position, and/or movement vector (e.g., angle, speed, etc.) associated with a target over time. The ultrasonic sensors 328 may include an ultrasonic transmitter and receiver, or transceiver, configured to generate and emit ultrasound waves and interpret returned echoes of those waves. In some embodiments, the ultrasonic sensors 328 may include at least one processor configured to interpret the returned ultrasonic waves and determine locational properties of targets. Examples of the ultrasonic sensors 328 as described herein may include, but are not limited to, at least one of Texas Instruments TIDA-00151 automotive ultrasonic sensor interface IC sensors, MaxBotix® MB8450 ultrasonic proximity sensor, MaxBotix® ParkSonar™-EZ ultrasonic proximity sensors, Murata Electronics MA40H1S-R open-structure ultrasonic sensors, Murata Electronics MA40S4R/S open-structure ultrasonic sensors, Murata Electronics MA58MF14-7N waterproof ultrasonic sensors, other industry-equivalent ultrasonic sensors and/or systems, and may perform ultrasonic target and/or obstacle detection in an environment around the vehicle 100 using any known or future-developed standard and/or architecture.

The camera sensors 332 may include one or more components configured to detect image information associated with an environment of the vehicle 100. In some embodiments, the camera sensors 332 may include a lens, filter, image sensor, and/or a digital image processer. It is an aspect of the present disclosure that multiple camera sensors 332 may be used together to generate stereo images providing depth measurements. Examples of the camera sensors 332 as described herein may include, but are not limited to, at least one of ON Semiconductor® MT9V024 Global Shutter VGA GS CMOS image sensors, Teledyne DALSA Falcon2 camera sensors, CMOSIS CMV50000 high-speed CMOS image sensors, other industry-equivalent camera sensors and/or systems, and may perform visual target and/or obstacle detection in an environment around the vehicle 100 using any known or future-developed standard and/or architecture.

The infrared (IR) sensors 336 may include one or more components configured to detect image information associated with an environment of the vehicle 100. The IR sensors 336 may be configured to detect targets in low-light, dark, or poorly-lit environments. The IR sensors 336 may include an IR light emitting element (e.g., IR light emitting diode (LED), etc.) and an IR photodiode. In some embodiments, the IR photodiode may be configured to detect returned IR light at or about the same wavelength to that emitted by the IR light emitting element. In some embodiments, the IR sensors 336 may include at least one processor configured to interpret the returned IR light and determine locational properties of targets. The IR sensors 336 may be configured to detect and/or measure a temperature associated with a target (e.g., an object, pedestrian, other vehicle, etc.). Examples of IR sensors 336 as described herein may include, but are not limited to, at least one of Opto Diode lead-salt IR array sensors, Opto Diode OD-850 Near-IR LED sensors, Opto Diode SA/SHA727 steady state IR emitters and IR detectors, FLIR® LS microbolometer sensors, FLIR® TacFLIR 380-HD InSb MWIR FPA and HD MWIR thermal sensors, FLIR® VOx 640×480 pixel detector sensors, Delphi IR sensors, other industry-equivalent IR sensors and/or systems, and may perform IR visual target and/or obstacle detection in an environment around the vehicle 100 using any known or future-developed standard and/or architecture.

The vehicle 100 can also include one or more interior sensors 337. Interior sensors 337 can measure characteristics of the inside environment of the vehicle 100. The interior sensors 337 may be as described in conjunction with FIG. 3B.

A navigation system 302 can include any hardware and/or software used to navigate the vehicle either manually or autonomously. The navigation system 302 may be as described in conjunction with FIG. 3C.

In some embodiments, the driving vehicle sensors and systems 304 may include other sensors 338 and/or combinations of the sensors 306-337 described above. Additionally or alternatively, one or more of the sensors 306-337 described above may include one or more processors configured to process and/or interpret signals detected by the one or more sensors 306-337. In some embodiments, the processing of at least some sensor information provided by the vehicle sensors and systems 304 may be processed by at least one sensor processor 340. Raw and/or processed sensor data may be stored in a sensor data memory 344 storage medium. In some embodiments, the sensor data memory 344 may store instructions used by the sensor processor 340 for processing sensor information provided by the sensors and systems 304. In any event, the sensor data memory 344 may be a disk drive, optical storage device, solid-state storage device such as a random access memory ("RAM") and/or a read-only memory ("ROM"), which can be programmable, flash-updateable, and/or the like.

The vehicle control system 348 may receive processed sensor information from the sensor processor 340 and determine to control an aspect of the vehicle 100. Controlling an aspect of the vehicle 100 may include presenting information via one or more display devices 372 associated with the vehicle, sending commands to one or more computing devices 368 associated with the vehicle, and/or controlling a driving operation of the vehicle. In some embodiments, the vehicle control system 348 may correspond to one or more computing systems that control driving operations of the vehicle 100 in accordance with the Levels of driving autonomy described above. In one embodiment, the vehicle control system 348 may operate a speed of the vehicle 100 by controlling an output signal to the accelerator and/or braking system of the vehicle. In this example, the vehicle control system 348 may receive sensor data describing an environment surrounding the vehicle 100 and, based on the sensor data received, determine to adjust the acceleration, power output, and/or braking of the vehicle 100. The vehicle control system 348 may additionally control steering and/or other driving functions of the vehicle 100.

The vehicle control system 348 may communicate, in real-time, with the driving sensors and systems 304 forming a feedback loop. In particular, upon receiving sensor information describing a condition of targets in the environment surrounding the vehicle 100, the vehicle control system 348 may autonomously make changes to a driving operation of the vehicle 100. The vehicle control system 348 may then receive subsequent sensor information describing any change to the condition of the targets detected in the environment as a result of the changes made to the driving operation. This continual cycle of observation (e.g., via the sensors, etc.) and action (e.g., selected control or non-control of vehicle operations, etc.) allows the vehicle 100 to operate autonomously in the environment.

In some embodiments, the one or more components of the vehicle 100 (e.g., the driving vehicle sensors 304, vehicle control system 348, display devices 372, etc.) may communicate across the communication network 352 to one or more entities 356A-N via a communications subsystem 350 of the vehicle 100. Embodiments of the communications subsystem 350 are described in greater detail in conjunction with FIG. 5. For instance, the navigation sensors 308 may receive global positioning, location, and/or navigational information from a navigation source 356A. In some embodiments, the navigation source 356A may be a global navigation satellite system (GNSS) similar, if not identical, to NAVSTAR GPS, GLONASS, EU Galileo, and/or the BeiDou Navigation Satellite System (BDS) to name a few.

In some embodiments, the vehicle control system 348 may receive control information from one or more control sources 356B. The control source 356 may provide vehicle control information including autonomous driving control commands, vehicle operation override control commands, and the like. The control source 356 may correspond to an autonomous vehicle control system, a traffic control system, an administrative control entity, and/or some other controlling server. It is an aspect of the present disclosure that the vehicle control system 348 and/or other components of the vehicle 100 may exchange communications with the control source 356 across the communication network 352 and via the communications subsystem 350.

Information associated with controlling driving operations of the vehicle 100 may be stored in a control data memory 364 storage medium. The control data memory 364 may store instructions used by the vehicle control system 348 for controlling driving operations of the vehicle 100, historical control information, autonomous driving control rules, and the like. In some embodiments, the control data memory 364 may be a disk drive, optical storage device, solid-state storage device such as a random access memory ("RAM") and/or a read-only memory ("ROM"), which can be programmable, flash-updateable, and/or the like.

In addition to the mechanical components described herein, the vehicle 100 may include a number of user interface devices. The user interface devices receive and translate human input into a mechanical movement or electrical signal or stimulus. The human input may be one or more of motion (e.g., body movement, body part movement, in two-dimensional or three-dimensional space, etc.), voice, touch, and/or physical interaction with the components of the vehicle 100. In some embodiments, the human input may be configured to control one or more functions of the vehicle 100 and/or systems of the vehicle 100 described herein. User interfaces may include, but are in no way limited to, at least one graphical user interface of a display device, steering wheel or mechanism, transmission lever or button (e.g., including park, neutral, reverse, and/or drive positions, etc.), throttle control pedal or mechanism, brake control pedal or mechanism, power control switch, communications equipment, etc.

FIG. 3B shows a block diagram of an embodiment of interior sensors 337 for a vehicle 100. The interior sensors 337 may be arranged into one or more groups, based at least partially on the function of the interior sensors 337. For example, the interior space of a vehicle 100 may include environmental sensors, user interface sensor(s), and/or safety sensors. Additionally or alternatively, there may be sensors associated with various devices inside the vehicle (e.g., smart phones, tablets, mobile computers, wearables, etc.)

Environmental sensors may comprise sensors configured to collect data relating to the internal environment of a vehicle 100. Examples of environmental sensors may include one or more of, but are not limited to: oxygen/air sensors 301, temperature sensors 303, humidity sensors 305, light/photo sensors 307, and more. The oxygen/air sensors 301 may be configured to detect a quality or characteristic of the air in the interior space 150 of the vehicle 100 (e.g., ratios and/or types of gasses comprising the air inside the vehicle 100, dangerous gas levels, safe gas levels, etc.). Temperature sensors 303 may be configured to detect temperature readings of one or more objects, users, and/or areas of a vehicle 100. Humidity sensors 305 may detect an amount of water vapor present in the air inside the vehicle 100. The light/photo sensors 307 can detect an amount of light present in the vehicle 100. Further, the light/photo sensors 307 may be configured to detect various levels of light intensity associated with light in the vehicle 100.

User interface sensors may comprise sensors configured to collect data relating to one or more users (e.g., a driver and/or passenger(s)) in a vehicle 100. As can be appreciated, the user interface sensors may include sensors that are configured to collect data from users in one or more areas of the vehicle 100. Examples of user interface sensors may include one or more of, but are not limited to: infrared sensors 309, motion sensors 311, weight sensors 313, wireless network sensors 315, biometric sensors 317, camera (or image) sensors 319, audio sensors 321, and more.

Infrared sensors 309 may be used to measure IR light irradiating from at least one surface, user, or other object in the vehicle 100. Among other things, the Infrared sensors 309 may be used to measure temperatures, form images (especially in low light conditions), identify users, and even detect motion in the vehicle 100.

The motion sensors 311 may detect motion and/or movement of objects inside the vehicle 100. Optionally, the motion sensors 311 may be used alone or in combination to detect movement. For example, a user may be operating a vehicle 100 (e.g., while driving, etc.) when a passenger in the rear of the vehicle 100 unbuckles a safety belt and proceeds to move about the vehicle 10. In this example, the movement of the passenger could be detected by the motion sensors 311. In response to detecting the movement and/or the direction associated with the movement, the passenger may be prevented from interfacing with and/or accessing at least some of the vehicle control features. As can be appreciated, the user may be alerted of the movement/motion such that the user can act to prevent the passenger from interfering with the vehicle controls. Optionally, the number of motion sensors in a vehicle may be increased to increase an accuracy associated with motion detected in the vehicle 100.

Weight sensors 313 may be employed to collect data relating to objects and/or users in various areas of the vehicle 100. In some cases, the weight sensors 313 may be included in the seats and/or floor of a vehicle 100. Optionally, the vehicle 100 may include a wireless network sensor 315. This sensor 315 may be configured to detect one or more wireless network(s) inside the vehicle 100. Examples of wireless networks may include, but are not limited to, wireless communications utilizing Bluetooth®, Wi-Fi™, ZigBee, IEEE 802.11, and other wireless technology standards. For example, a mobile hotspot may be detected inside the vehicle 100 via the wireless network sensor 315. In this case, the vehicle 100 may determine to utilize and/or share the mobile hotspot detected via/with one or more other devices associated with the vehicle 100.

Biometric sensors 317 may be employed to identify and/or record characteristics associated with a user. It is anticipated that biometric sensors 317 can include at least one of image sensors, IR sensors, fingerprint readers, weight sensors, load cells, force transducers, heart rate monitors, blood pressure monitors, and the like as provided herein.

The camera sensors 319 may record still images, video, and/or combinations thereof. Camera sensors 319 may be used alone or in combination to identify objects, users, and/or other features, inside the vehicle 100. Two or more camera sensors 319 may be used in combination to form, among other things, stereo and/or three-dimensional (3D) images. The stereo images can be recorded and/or used to determine depth associated with objects and/or users in a vehicle 100. Further, the camera sensors 319 used in combination may determine the complex geometry associated with identifying characteristics of a user. For example, the camera sensors 319 may be used to determine dimensions between various features of a user's face (e.g., the depth/distance from a user's nose to a user's cheeks, a linear distance between the center of a user's eyes, and more). These dimensions may be used to verify, record, and even modify characteristics that serve to identify a user. The camera sensors 319 may also be used to determine movement associated with objects and/or users within the vehicle 100. It should be appreciated that the number of image sensors used in a vehicle 100 may be increased to provide greater dimensional accuracy and/or views of a detected image in the vehicle 100.

The audio sensors 321 may be configured to receive audio input from a user of the vehicle 100. The audio input from a user may correspond to voice commands, conversations detected in the vehicle 100, phone calls made in the vehicle 100, and/or other audible expressions made in the vehicle 100. Audio sensors 321 may include, but are not limited to, microphones and other types of acoustic-to-electric transducers or sensors. Optionally, the interior audio sensors 321 may be configured to receive and convert sound waves into an equivalent analog or digital signal. The interior audio sensors 321 may serve to determine one or more locations associated with various sounds in the vehicle 100. The location of the sounds may be determined based on a comparison of volume levels, intensity, and the like, between sounds detected by two or more interior audio sensors 321. For instance, a first audio sensors 321 may be located in a first area of the vehicle 100 and a second audio sensors 321 may be located in a second area of the vehicle 100. If a sound is detected at a first volume level by the first audio sensors 321 A and a second, higher, volume level by the second audio sensors 321 in the second area of the vehicle 100, the sound may be determined to be closer to the second area of the vehicle 100. As can be appreciated, the number of sound receivers used in a vehicle 100 may be increased (e.g., more than two, etc.) to increase measurement accuracy surrounding sound detection and location, or source, of the sound (e.g., via triangulation, etc.).

The safety sensors may comprise sensors configured to collect data relating to the safety of a user and/or one or more components of a vehicle 100. Examples of safety sensors may include one or more of, but are not limited to: force sensors 325, mechanical motion sensors 327, orientation sensors 329, restraint sensors 331, and more.

The force sensors 325 may include one or more sensors inside the vehicle 100 configured to detect a force observed in the vehicle 100. One example of a force sensor 325 may include a force transducer that converts measured forces (e.g., force, weight, pressure, etc.) into output signals. Mechanical motion sensors 327 may correspond to encoders, accelerometers, damped masses, and the like. Optionally, the mechanical motion sensors 327 may be adapted to measure the force of gravity (i.e., G-force) as observed inside the vehicle 100. Measuring the G-force observed inside a vehicle 100 can provide valuable information related to a vehicle's acceleration, deceleration, collisions, and/or forces that may have been suffered by one or more users in the vehicle 100. Orientation sensors 329 can include accelerometers, gyroscopes, magnetic sensors, and the like that are configured to detect an orientation associated with the vehicle 100.

The restraint sensors 331 may correspond to sensors associated with one or more restraint devices and/or systems in a vehicle 100. Seatbelts and airbags are examples of restraint devices and/or systems. As can be appreciated, the restraint devices and/or systems may be associated with one or more sensors that are configured to detect a state of the device/system. The state may include extension, engagement, retraction, disengagement, deployment, and/or other electrical or mechanical conditions associated with the device/system.

The associated device sensors 323 can include any sensors that are associated with a device in the vehicle 100. As previously stated, typical devices may include smart phones, tablets, laptops, mobile computers, and the like. It is anticipated that the various sensors associated with these devices can be employed by the vehicle control system 348. For example, a typical smart phone can include, an image sensor, an IR sensor, audio sensor, gyroscope, accelerometer, wireless network sensor, fingerprint reader, and more. It is an aspect of the present disclosure that one or more of these associated device sensors 323 may be used by one or more subsystems of the vehicle 100.

FIG. 3C illustrates a GPS/Navigation subsystem(s) 302. The navigation subsystem(s) 302 can be any present or future-built navigation system that may use location data, for example, from the Global Positioning System (GPS), to provide navigation information or control the vehicle 100. The navigation subsystem(s) 302 can include several components, such as, one or more of, but not limited to: a GPS Antenna/receiver 331, a location module 333, a maps database 335, etc. Generally, the several components or modules 331-335 may be hardware, software, firmware, computer readable media, or combinations thereof.

A GPS Antenna/receiver 331 can be any antenna, GPS puck, and/or receiver capable of receiving signals from a GPS satellite or other navigation system. The signals may be demodulated, converted, interpreted, etc. by the GPS Antenna/receiver 331 and provided to the location module 333. Thus, the GPS Antenna/receiver 331 may convert the time signals from the GPS system and provide a location (e.g., coordinates on a map) to the location module 333. Alternatively, the location module 333 can interpret the time signals into coordinates or other location information.

The location module 333 can be the controller of the satellite navigation system designed for use in the vehicle 100. The location module 333 can acquire position data, as from the GPS Antenna/receiver 331, to locate the user or vehicle 100 on a road in the unit's map database 335. Using the road database 335, the location module 333 can give directions to other locations along roads also in the database 335. When a GPS signal is not available, the location module 333 may apply dead reckoning to estimate distance data from sensors 304 including one or more of, but not limited to, a speed sensor attached to the drive train of the vehicle 100, a gyroscope, an accelerometer, etc. Additionally, or alternatively, the location module 333 may use known locations of Wi-Fi hotspots, cell tower data, etc. to determine the position of the vehicle 100, such as by using time difference of arrival (TDOA) and/or frequency difference of arrival (FDOA) techniques.

The maps database 335 can include any hardware and/or software to store information about maps, geographical information system (GIS) information, location information, etc. The maps database 335 can include any data definition or other structure to store the information. Generally, the maps database 335 can include a road database that may include one or more vector maps of areas of interest. Street names, street numbers, house numbers, and other information can be encoded as geographic coordinates so that the user can find some desired destination by street address. Points of interest (waypoints) can also be stored with their geographic coordinates. For example, a point of interest may include speed cameras, fuel stations, public parking, and "parked here" (or "you parked here") information. The maps database 335 may also include road or street characteristics, for example, speed limits, location of stop lights/stop signs, lane divisions, school locations, etc. The map database contents can be produced or updated by a server connected through a wireless system in communication with the Internet, even as the vehicle 100 is driven along existing streets, yielding an up-to-date map.

The vehicle control system 348, when operating in L4 or L5 and based on sensor information from the external and interior vehicle sensors, can control the driving behavior of the vehicle in response to the current vehicle location, sensed object information, sensed vehicle occupant information, vehicle-related information, exterior environmental information, and navigation information from the maps database 335.

The sensed object information refers to sensed information regarding objects external to the vehicle. Examples include animate objects such as animals and attributes thereof (e.g., animal type, current spatial location, current activity, etc.), and pedestrians and attributes thereof (e.g., identity, age, sex, current spatial location, current activity, etc.), and the like and inanimate objects and attributes thereof such as other vehicles (e.g., current vehicle state or activity (parked or in motion or level of automation currently employed), occupant or operator identity, vehicle type (truck, car, etc.), vehicle spatial location, etc.), curbs (topography and spatial location), potholes (size and spatial location), lane division markers (type or color and spatial locations), signage (type or color and spatial locations such as speed limit signs, yield signs, stop signs, and other restrictive or warning signs), traffic signals (e.g., red, yellow, blue, green, etc.), buildings (spatial locations), walls (height and spatial locations), barricades (height and spatial location), and the like.

The sensed occupant information refers to sensed information regarding occupants internal to the vehicle. Examples include the number and identities of occupants and attributes thereof (e.g., seating position, age, sex, gaze direction, biometric information, authentication information, preferences, historic behavior patterns (such as current or historical user driving behavior, historical user route, destination, and waypoint preferences), nationality, ethnicity and race, language preferences (e.g., Spanish, English, Chinese, etc.), current occupant role (e.g., operator or passenger), occupant priority ranking (e.g., vehicle owner is given a higher ranking than a child occupant), electronic calendar information (e.g., Outlook™), and medical information and history, etc.

The vehicle-related information refers to sensed information regarding the selected vehicle. Examples include vehicle manufacturer, type, model, year of manufacture, current geographic location, current vehicle state or activity (parked or in motion or level of automation currently employed), vehicle specifications and capabilities, currently sensed operational parameters for the vehicle, and other information.

The exterior environmental information refers to sensed information regarding the external environment of the selected vehicle. Examples include road type (pavement, gravel, brick, etc.), road condition (e.g., wet, dry, icy, snowy, etc.), weather condition (e.g., outside temperature, pressure, humidity, wind speed and direction, etc.), ambient light conditions (e.g., time-of-day), degree of development of vehicle surroundings (e.g., urban or rural), and the like.

In a typical implementation, the automated vehicle control system 348, based on feedback from certain sensors, specifically the LIDAR and radar sensors positioned around the circumference of the vehicle, constructs a three-dimensional map in spatial proximity to the vehicle that enables the automated vehicle control system 348 to identify and spatially locate animate and inanimate objects. Other sensors, such as inertial measurement units, gyroscopes, wheel encoders, sonar sensors, motion sensors to perform odometry calculations with respect to nearby moving exterior objects, and exterior facing cameras (e.g., to perform computer vision processing) can provide further contextual information for generation of a more accurate three-dimensional map. The navigation information is combined with the three-dimensional map to provide short, intermediate and long range course tracking and route selection. The vehicle control system 348 processes real-world information as well as GPS data, and driving speed to determine accurately the precise position of each vehicle, down to a few centimeters all while making corrections for nearby animate and inanimate objects.

The vehicle control system 348 can process in substantial real time the aggregate mapping information and models (or predicts) behavior of occupants of the current vehicle and other nearby animate or inanimate objects and, based on the aggregate mapping information and modeled behavior, issues appropriate commands regarding vehicle operation. While some commands are hard-coded into the vehicle, such as stopping at red lights and stop signs, other responses are learned and recorded by profile updates based on previous driving experiences. Examples of learned behavior include a slow-moving or stopped vehicle or emergency vehicle in a right lane suggests a higher probability that the car following it will attempt to pass, a pot hole, rock, or other foreign object in the roadway equates to a higher probability that a driver will swerve to avoid it, and traffic congestion in one lane means that other drivers moving in the same direction will have a higher probability of passing in an adjacent lane or by driving on the shoulder.

Figure 4:
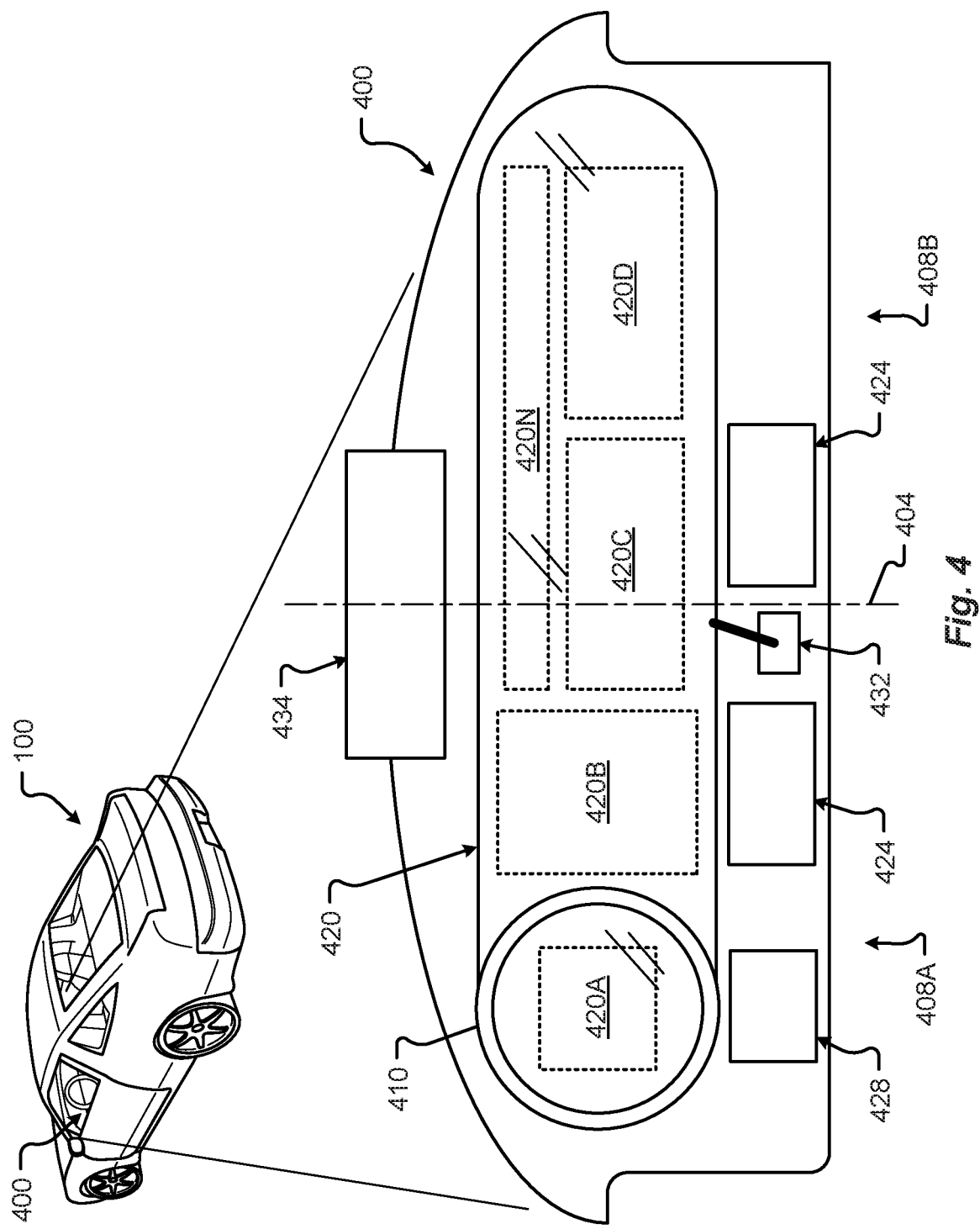
FIG. 4 shows an embodiment of the instrument panel of the vehicle according to one embodiment of the present disclosure.

FIG. 4 shows one embodiment of the instrument panel 400 of the vehicle 100. The instrument panel 400 of vehicle 100 comprises a steering wheel 410, a vehicle operational display 420 (e.g., configured to present and/or display driving data such as speed, measured air resistance, vehicle information, entertainment information, etc.), one or more auxiliary displays 424 (e.g., configured to present and/or display information segregated from the operational display 420, entertainment applications, movies, music, etc.), a heads-up display 434 (e.g., configured to display any information previously described including, but in no way limited to, guidance information such as route to destination, or obstacle warning information to warn of a potential collision, or some or all primary vehicle operational data such as speed, resistance, etc.), a power management display 428 (e.g., configured to display data corresponding to electric power levels of vehicle 100, reserve power, charging status, etc.), and an input device 432 (e.g., a controller, touchscreen, or other interface device configured to interface with one or more displays in the instrument panel or components of the vehicle 100. The input device 432 may be configured as a joystick, mouse, touchpad, tablet, 3D gesture capture device, etc.). In some embodiments, the input device 432 may be used to manually maneuver a portion of the vehicle 100 into a charging position (e.g., moving a charging plate to a desired separation distance, etc.).

While one or more of displays of instrument panel 400 may be touch-screen displays, it should be appreciated that the vehicle operational display may be a display incapable of receiving touch input. For instance, the operational display 420 that spans across an interior space centerline 404 and across both a first zone 408A and a second zone 408B may be isolated from receiving input from touch, especially from a passenger. In some cases, a display that provides vehicle operation or critical systems information and interface may be restricted from receiving touch input and/or be configured as a non-touch display. This type of configuration can prevent dangerous mistakes in providing touch input where such input may cause an accident or unwanted control.

In some embodiments, one or more displays of the instrument panel 400 may be mobile devices and/or applications residing on a mobile device such as a smart phone. Additionally, or alternatively, any of the information described herein may be presented to one or more portions 420A-N of the operational display 420 or other display 424, 428, 434. In one embodiment, one or more displays of the instrument panel 400 may be physically separated or detached from the instrument panel 400. In some cases, a detachable display may remain tethered to the instrument panel.

The portions 420A-N of the operational display 420 may be dynamically reconfigured and/or resized to suit any display of information as described. Additionally, or alternatively, the number of portions 420A-N used to visually present information via the operational display 420 may be dynamically increased or decreased as required, and are not limited to the configurations shown.

Figure 5:
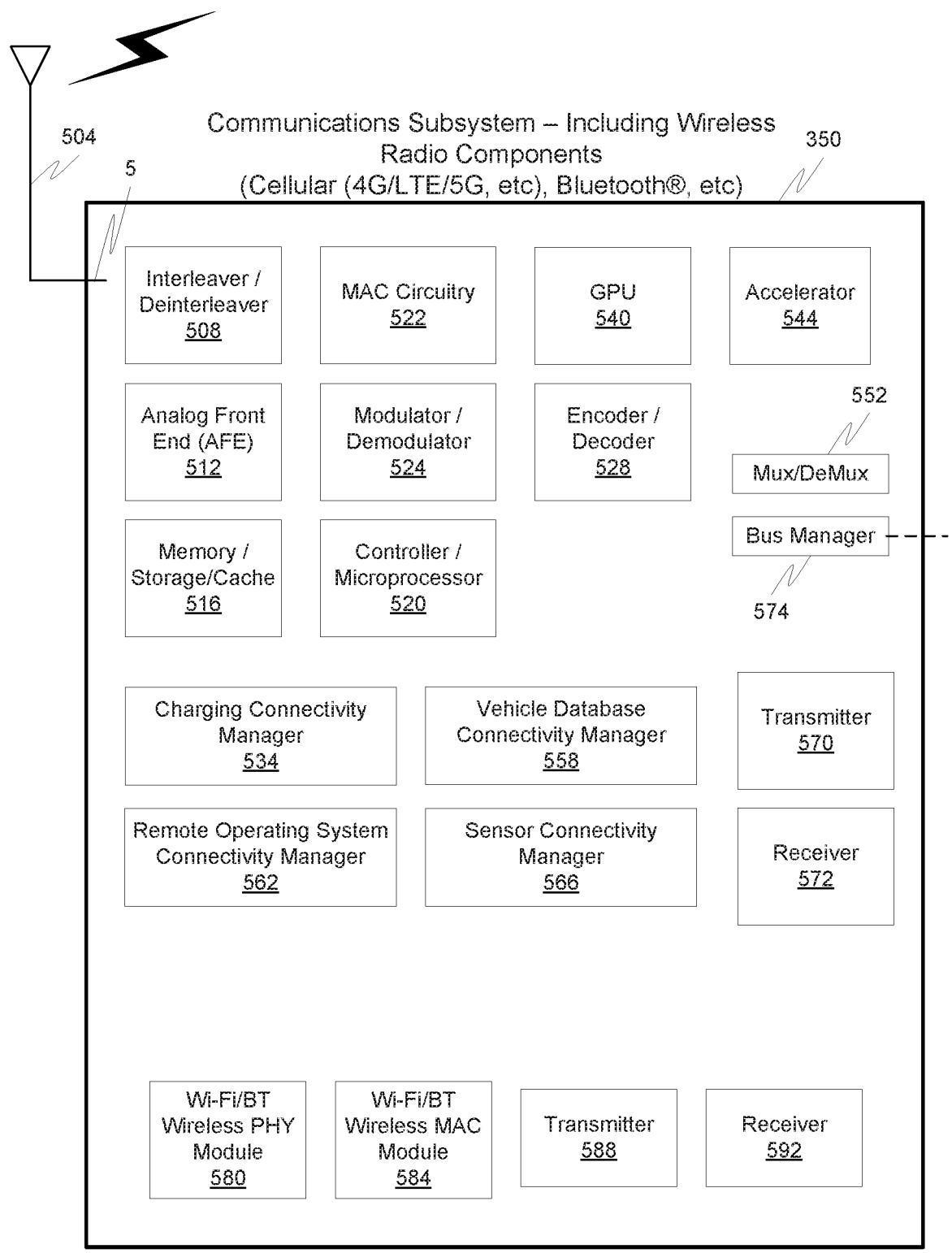
FIG. 5 is a block diagram of an embodiment of a communications subsystem of the vehicle.

FIG. 5 illustrates a hardware diagram of communications componentry that can be optionally associated with the vehicle 100 in accordance with embodiments of the present disclosure.

The communications componentry can include one or more wired or wireless devices such as a transceiver(s) and/or modem that allows communications not only between the various systems disclosed herein but also with other devices, such as devices on a network, and/or on a distributed network such as the Internet and/or in the cloud and/or with other vehicle(s).

The communications subsystem 350 can also include inter- and intra-vehicle communications capabilities such as hotspot and/or access point connectivity for any one or more of the vehicle occupants and/or vehicle-to-vehicle communications.

Additionally, and while not specifically illustrated, the communications subsystem 350 can include one or more communications links (that can be wired or wireless) and/or communications busses (managed by the bus manager 574), including one or more of CANbus, OBD-II, ARCINC 429, Byteflight, CAN (Controller Area Network), D2B (Domestic Digital Bus), FlexRay, DC-BUS, IDB-1394, IEBus, I2C, ISO 9141-1/-2, J1708, J1587, J1850, J1939, ISO 11783, Keyword Protocol 2000, LIN (Local Interconnect Network), MOST (Media Oriented Systems Transport), Multifunction Vehicle Bus, SMARTwireX, SPI, VAN (Vehicle Area Network), and the like or in general any communications protocol and/or standard(s).

The various protocols and communications can be communicated one or more of wirelessly and/or over transmission media such as single wire, twisted pair, fiber optic, IEEE 1394, MIL-STD-1553, MIL-STD-1773, power-line communication, or the like. (All of the above standards and protocols are incorporated herein by reference in their entirety).

As discussed, the communications subsystem 350 enables communications between any of the inter-vehicle systems and subsystems as well as communications with non-collocated resources, such as those reachable over a network such as the Internet.

The communications subsystem 350, in addition to well-known componentry (which has been omitted for clarity), includes interconnected elements including one or more of: one or more antennas 504, an interleaver/deinterleaver 508, an analog front end (AFE) 512, memory/storage/cache 516, controller/microprocessor 520, MAC circuitry 522, modulator/demodulator 524, encoder/decoder 528, a plurality of connectivity managers 534, 558, 562, 566, GPU 540, accelerator 544, a multiplexer/demultiplexer 552, transmitter 570, receiver 572 and additional wireless radio components such as a Wi-Fi PHY/Bluetooth® module 580, a Wi-Fi/BT MAC module 584, additional transmitter(s) 588 and additional receiver(s) 592. The various elements in the device 350 are connected by one or more links/busses 5 (not shown, again for sake of clarity).

The device 350 can have one more antennas 504, for use in wireless communications such as multi-input multi-output (MIMO) communications, multi-user multi-input multi-output (MU-MIMO) communications Bluetooth®, LTE, 4G, 5G, Near-Field Communication (NFC), etc., and in general for any type of wireless communications. The antenna(s) 504 can include, but are not limited to one or more of directional antennas, omnidirectional antennas, monopoles, patch antennas, loop antennas, microstrip antennas, dipoles, and any other antenna(s) suitable for communication transmission/reception. In an exemplary embodiment, transmission/reception using MIMO may require particular antenna spacing. In another exemplary embodiment, MIMO transmission/reception can enable spatial diversity allowing for different channel characteristics at each of the antennas. In yet another embodiment, MIMO transmission/reception can be used to distribute resources to multiple users for example within the vehicle 100 and/or in another vehicle.

Antenna(s) 504 generally interact with the Analog Front End (AFE) 512, which is needed to enable the correct processing of the received modulated signal and signal conditioning for a transmitted signal. The AFE 512 can be functionally located between the antenna and a digital baseband system in order to convert the analog signal into a digital signal for processing and vice-versa.

The subsystem 350 can also include a controller/microprocessor 520 and a memory/storage/cache 516. The subsystem 350 can interact with the memory/storage/cache 516 which may store information and operations necessary for configuring and transmitting or receiving the information described herein. The memory/storage/cache 516 may also be used in connection with the execution of application programming or instructions by the controller/microprocessor 520, and for temporary or long term storage of program instructions and/or data. As examples, the memory/storage/cache 520 may comprise a computer-readable device, RAM, ROM, DRAM, SDRAM, and/or other storage device(s) and media.

The controller/microprocessor 520 may comprise a general purpose programmable processor or controller for executing application programming or instructions related to the subsystem 350. Furthermore, the controller/microprocessor 520 can perform operations for configuring and transmitting/receiving information as described herein. The controller/microprocessor 520 may include multiple processor cores, and/or implement multiple virtual processors. Optionally, the controller/microprocessor 520 may include multiple physical processors. By way of example, the controller/microprocessor 520 may comprise a specially configured Application Specific Integrated Circuit (ASIC) or other integrated circuit, a digital signal processor(s), a controller, a hardwired electronic or logic circuit, a programmable logic device or gate array, a special purpose computer, or the like.

The subsystem 350 can further include a transmitter(s) 570, 588 and receiver(s) 572, 592 which can transmit and receive signals, respectively, to and from other devices, subsystems and/or other destinations using the one or more antennas 504 and/or links/busses. Included in the subsystem 350 circuitry is the medium access control or MAC Circuitry 522. MAC circuitry 522 provides for controlling access to the wireless medium. In an exemplary embodiment, the MAC circuitry 522 may be arranged to contend for the wireless medium and configure frames or packets for communicating over the wired/wireless medium.

The subsystem 350 can also optionally contain a security module (not shown). This security module can contain information regarding but not limited to, security parameters required to connect the device to one or more other devices or other available network(s), and can include WEP or WPA/WPA-2 (optionally+AES and/or TKIP) security access keys, network keys, etc. The WEP security access key is a security password used by Wi-Fi networks. Knowledge of this code can enable a wireless device to exchange information with an access point and/or another device. The information exchange can occur through encoded messages with the WEP access code often being chosen by the network administrator. WPA is an added security standard that is also used in conjunction with network connectivity with stronger encryption than WEP.

In some embodiments, the communications subsystem 350 also includes a GPU 540, an accelerator 544, a Wi-Fi/BT/BLE (Bluetooth® Low-Energy) PHY module 580 and a Wi-Fi/BT/BLE MAC module 584 and optional wireless transmitter 588 and optional wireless receiver 592. In some embodiments, the GPU 540 may be a graphics processing unit, or visual processing unit, comprising at least one circuit and/or chip that manipulates and changes memory to accelerate the creation of images in a frame buffer for output to at least one display device. The GPU 540 may include one or more of a display device connection port, printed circuit board (PCB), a GPU chip, a metal-oxide-semiconductor field-effect transistor (MOSFET), memory (e.g., single data rate random-access memory (SDRAM), double data rate random-access memory (DDR) RAM, etc., and/or combinations thereof), a secondary processing chip (e.g., handling video out capabilities, processing, and/or other functions in addition to the GPU chip, etc.), a capacitor, heatsink, temperature control or cooling fan, motherboard connection, shielding, and the like.

The various connectivity managers 534, 558, 562, 566 manage and/or coordinate communications between the subsystem 350 and one or more of the systems disclosed herein and one or more other devices/systems. The connectivity managers 534, 558, 562, 566 include a charging connectivity manager 534, a vehicle database connectivity manager 558, a remote operating system connectivity manager 562, and a sensor connectivity manager 566.

The charging connectivity manager 534 can coordinate not only the physical connectivity between the vehicle 100 and a charging device/vehicle, but can also communicate with one or more of a power management controller, one or more third parties and optionally a billing system(s). As an example, the vehicle 100 can establish communications with the charging device/vehicle to one or more of coordinate interconnectivity between the two (e.g., by spatially aligning the charging receptacle on the vehicle with the charger on the charging vehicle) and optionally share navigation information. Once charging is complete, the amount of charge provided can be tracked and optionally forwarded to, for example, a third party for billing. In addition to being able to manage connectivity for the exchange of power, the charging connectivity manager 534 can also communicate information, such as billing information to the charging vehicle and/or a third party. This billing information could be, for example, the owner of the vehicle, the driver/occupant(s) of the vehicle, company information, or in general any information usable to charge the appropriate entity for the power received.

The vehicle database connectivity manager 558 allows the subsystem to receive and/or share information stored in the vehicle database. This information can be shared with other vehicle components/subsystems and/or other entities, such as third parties and/or charging systems. The information can also be shared with one or more vehicle occupant devices, such as an app (application) on a mobile device the driver uses to track information about the vehicle 100 and/or a dealer or service/maintenance provider. In general, any information stored in the vehicle database can optionally be shared with any one or more other devices optionally subject to any privacy or confidentially restrictions.

The remote operating system connectivity manager 562 facilitates communications between the vehicle 100 and any one or more autonomous vehicle systems. These communications can include one or more of navigation information, vehicle information, other vehicle information, weather information, occupant information, or in general any information related to the remote operation of the vehicle 100.

The sensor connectivity manager 566 facilitates communications between any one or more of the vehicle sensors (e.g., the driving vehicle sensors and systems 304, etc.) and any one or more of the other vehicle systems. The sensor connectivity manager 566 can also facilitate communications between any one or more of the sensors and/or vehicle systems and any other destination, such as a service company, app, or in general to any destination where sensor data is needed.

In accordance with one exemplary embodiment, any of the communications discussed herein can be communicated via the conductor(s) used for charging. One exemplary protocol usable for these communications is Power-line communication (PLC). PLC is a communication protocol that uses electrical wiring to simultaneously carry both data, and Alternating Current (AC) electric power transmission or electric power distribution. It is also known as power-line carrier, power-line digital subscriber line (PDSL), mains communication, power-line telecommunications, or power-line networking (PLN). For DC environments in vehicles PLC can be used in conjunction with CAN-bus, LIN-bus over power line (DC-LIN) and DC-BUS.

The communications subsystem can also optionally manage one or more identifiers, such as an IP (Internet Protocol) address(es), associated with the vehicle and one or other system or subsystems or components and/or devices therein. These identifiers can be used in conjunction with any one or more of the connectivity managers as discussed herein.

Figure 6:
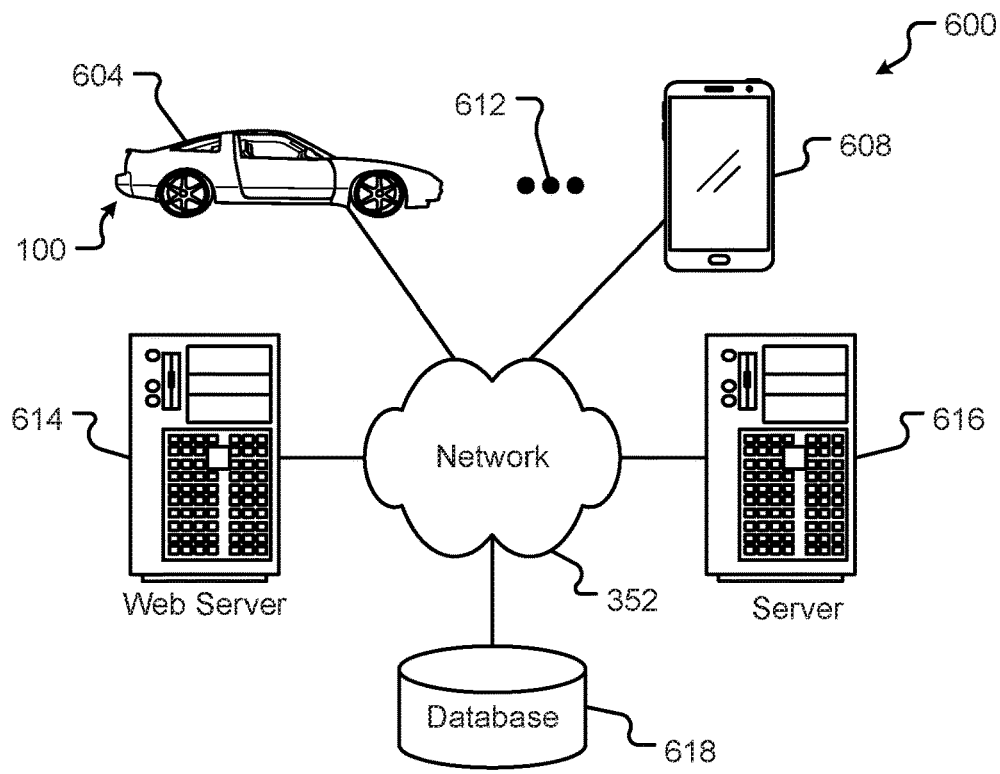
FIG. 6 is a block diagram of a computing environment associated with the embodiments presented herein.

FIG. 6 illustrates a block diagram of a computing environment 600 that may function as the servers, user computers, or other systems provided and described herein. The computing environment 600 includes one or more user computers, or computing devices, such as a vehicle computing device 604, a communication device 608, and/or more 612. The computing devices 604, 608, 612 may include general purpose personal computers (including, merely by way of example, personal computers, and/or laptop computers running various versions of Microsoft Corp.'s Windows® and/or Apple Corp.'s Macintosh® operating systems) and/or workstation computers running any of a variety of commercially-available UNIX® or UNIX-like operating systems.

These computing devices 604, 608, 612 may also have any of a variety of applications, including for example, database client and/or server applications, and web browser applications. Alternatively, the computing devices 604, 608, 612 may be any other electronic device, such as a thin-client computer, Internet-enabled mobile telephone, and/or personal digital assistant, capable of communicating via a network 352 and/or displaying and navigating web pages or other types of electronic documents or information. Although the exemplary computing environment 600 is shown with two computing devices, any number of user computers or computing devices may be supported.

The computing environment 600 may also include one or more servers 614, 616. In this example, server 614 is shown as a web server and server 616 is shown as an application server. The web server 614, which may be used to process requests for web pages or other electronic documents from computing devices 604, 608, 612. The web server 614 can be running an operating system including any of those discussed above, as well as any commercially-available server operating systems. The web server 614 can also run a variety of server applications, including SIP (Session Initiation Protocol) servers, HTTP(s) servers, FTP servers, CGI servers, database servers, Java® servers, and the like. In some instances, the web server 614 may publish operations available operations as one or more web services.

The computing environment 600 may also include one or more file and or/application servers 616, which can, in addition to an operating system, include one or more applications accessible by a client running on one or more of the computing devices 604, 608, 612. The server(s) 616 and/or 614 may be one or more general purpose computers capable of executing programs or scripts in response to the computing devices 604, 608, 612. As one example, the server 616, 614 may execute one or more web applications. The web application may be implemented as one or more scripts or programs written in any programming language, such as Java®, C, C#®, or C++, and/or any scripting language, such as Perl, Python, or TCL, as well as combinations of any programming/scripting languages. The application server(s) 616 may also include database servers, including without limitation those commercially available from Oracle®, Microsoft®, Sybase®, IBM® and the like, which can process requests from database clients running on a computing device 604, 608, 612.

The web pages created by the server 614 and/or 616 may be forwarded to a computing device 604, 608, 612 via a web (file) server 614, 616. Similarly, the web server 614 may be able to receive web page requests, web services invocations, and/or input data from a computing device 604, 608, 612 (e.g., a user computer, etc.) and can forward the web page requests and/or input data to the web (application) server 616. In further embodiments, the server 616 may function as a file server. Although for ease of description, FIG. 6 illustrates a separate web server 614 and file/application server 616, those skilled in the art will recognize that the functions described with respect to servers 614, 616 may be performed by a single server and/or a plurality of specialized servers, depending on implementation-specific needs and parameters. The computer systems 604, 608, 612, web (file) server 614 and/or web (application) server 616 may function as the system, devices, or components described in FIGS. 1-6.

The computing environment 600 may also include a database 618. The database 618 may reside in a variety of locations. By way of example, database 618 may reside on a storage medium local to (and/or resident in) one or more of the computers 604, 608, 612, 614, 616. Alternatively, it may be remote from any or all of the computers 604, 608, 612, 614, 616, and in communication (e.g., via the network 352) with one or more of these. The database 618 may reside in a storage-area network ("SAN") familiar to those skilled in the art. Similarly, any necessary files for performing the functions attributed to the computers 604, 608, 612, 614, 616 may be stored locally on the respective computer and/or remotely, as appropriate. The database 618 may be a relational database, such as Oracle 20i®, that is adapted to store, update, and retrieve data in response to SQL-formatted commands.

Figure 7:
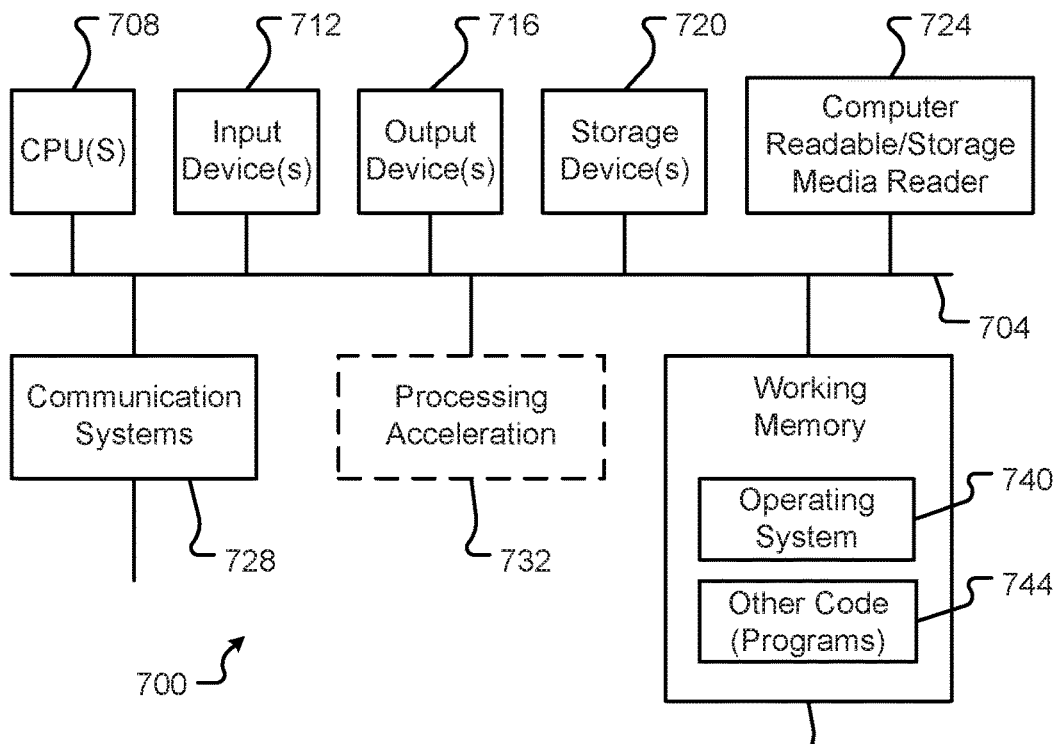
FIG. 7 is a block diagram of a computing device associated with one or more components described herein.

FIG. 7 illustrates one embodiment of a computer system 700 upon which the servers, user computers, computing devices, or other systems or components described above may be deployed or executed. The computer system 700 is shown comprising hardware elements that may be electrically coupled via a bus 704. The hardware elements may include one or more central processing units (CPUs) 708; one or more input devices 712 (e.g., a mouse, a keyboard, etc.); and one or more output devices 716 (e.g., a display device, a printer, etc.). The computer system 700 may also include one or more storage devices 720. By way of example, storage device(s) 720 may be disk drives, optical storage devices, solid-state storage devices such as a random access memory ("RAM") and/or a read-only memory ("ROM"), which can be programmable, flash-updateable and/or the like.

The computer system 700 may additionally include a computer-readable storage media reader 724; a communications system 728 (e.g., a modem, a network card (wireless or wired), an infra-red communication device, etc.); and working memory 736, which may include RAM and ROM devices as described above. The computer system 700 may also include a processing acceleration unit 732, which can include a DSP, a special-purpose processor, and/or the like.

The computer-readable storage media reader 724 can further be connected to a computer-readable storage medium, together (and, optionally, in combination with storage device(s) 720) comprehensively representing remote, local, fixed, and/or removable storage devices plus storage media for temporarily and/or more permanently containing computer-readable information. The communications system 728 may permit data to be exchanged with a network and/or any other computer described above with respect to the computer environments described herein. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information.

The computer system 700 may also comprise software elements, shown as being currently located within a working memory 736, including an operating system 740 and/or other code 744. It should be appreciated that alternate embodiments of a computer system 700 may have numerous variations from that described above. For example, customized hardware might also be used and/or particular elements might be implemented in hardware, software (including portable software, such as applets), or both. Further, connection to other computing devices such as network input/output devices may be employed.

Examples of the processors 340, 708 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Embodiments of the present disclosure are directed to dynamically and automatically adjusting a standard regenerative braking intensity. Roadway data, data from one or more sensors of the vehicle and data comprising parameter values for operating states of the vehicle regarding a roadway from a route being navigated by the vehicle are received by a processor of a control system of the vehicle. Standard regenerative braking intensity values based on a vehicle's acceleration is retrieved from memory. Adjusted regenerative braking intensity values are calculated based on at least one of the roadway data, the sensor data, the parameter values of the operating states of the vehicle and the standard regenerative braking intensity values. The adjusted regenerative braking intensity values are transmitted to the control system and an acceleration or deacceleration amount is applied to the vehicle based on the adjusted regenerative braking intensity values.

Figure 8:
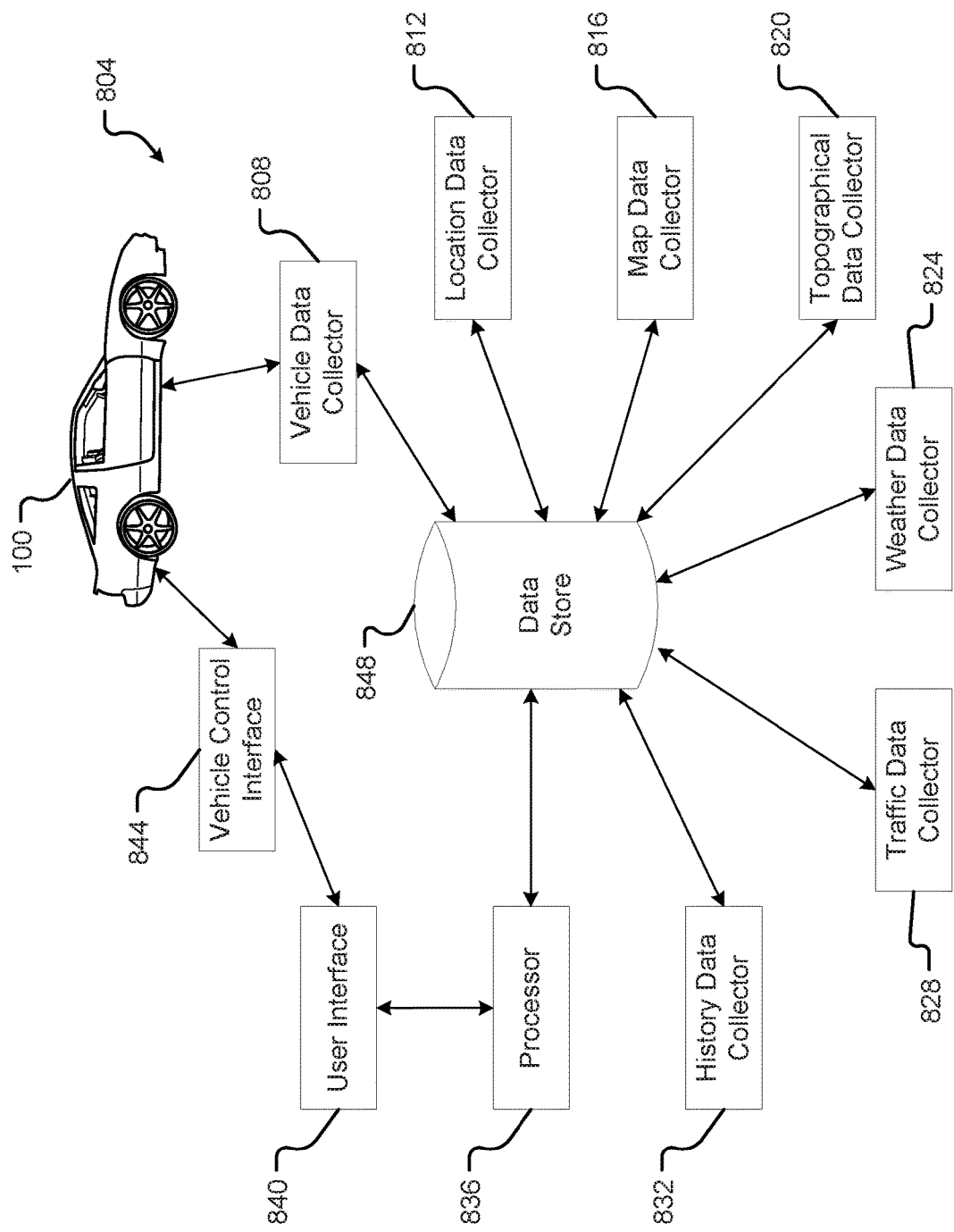
FIG. 8 is a schematic illustration of one example of system components and data flow which may be included in a vehicle controller shown in FIGS. 3A and 3C according to embodiments of the present disclosure.

FIG. 8 is a schematic illustration of one example of system components and data flow which may be included in a vehicle controller 804 according to embodiments of the present disclosure. Besides the components illustrated in FIGS. 3A and 3C included with vehicle control system/subsystem 348, controller 804 may include a vehicle data collector 808, a location data collector 812, a map data collector 816, a topographical data collector 820, a weather data collector 824, a traffic data collector 828, a history data collector 832, a processor 836, a user interface 840, a vehicle control interface 844 and a data store 848. User interface 840 is for use by a user such as a driver or other occupant of vehicle 100 whereas the vehicle control interface 808 is for interfacing with other vehicle systems. User interface 840 may be similar, if not identical, to display device 372 described in conjunction with FIG. 3A and/or input device(s) 712 described in conjunction with FIG. 7. User interface 840 accepts user input from a user such as inputs regarding the amount of regenerative braking to be applied, destinations, and possibly other driver specific parameters affecting the vehicle's performance.

Processor 836 may calculate an adjusted amount of regenerative braking dynamically and automatically to offer ideal user preferences, optimized component health, and optimized energy efficiency and range. Other uses may for example include intentionally increasing an amount of regenerative braking to create waste heat for the vehicle's thermal system. For example, an adjusted amount of regenerative braking may include retrieving standard regenerative braking intensity values for vehicle 100 from data store 848, calculating an adjusted amount of regenerative braking dynamically and automatically based on preferences entered by the user using user interface 840 and the standard regenerative braking intensity values, writing the results of the calculation back to data store 848, and updating the user interface 840. User interface 840 may then be configured to present the user with various adjustment options offering the user opportunities to input subsequent selections to refine the adjustment options, input new preferences to generate new adjustment options or act on one of the current adjustment options presented. Where the user decides to act on one of the current adjustment options, vehicle controller 804 may then send commands to control the behavior of the vehicle 100 and pass them to the various vehicle subsystems using vehicle control interface 844. Vehicle control interface 844 can interact with various systems and subsystems in vehicle 100 to collect data about vehicle 100, such as the data indicated and described in FIGS. 1-3C, or to pass commands to the subsystems in vehicle 100 modifying the behavior of the vehicle's accelerator and/or braking system for adjusting the standard regenerative braking intensity as discussed in greater detail below.

Vehicle controller 804 generates adjustment options using data received from numerous sources, some examples of which are shown. For example, the vehicle data collector 808 (which may be similar, if not identical, to sensor processor 340 described in conjunction with FIG. 3A) collects information from the vehicle 100. This information may include various information related to battery drain such as the present electrical current draw on the battery and the potential difference across the battery terminal. This information, for example may be displayed to the user on power management display 428 illustrated in FIG. 4. In some vehicles, the main battery may be composed of multiple individual cells coupled together in series or in parallel, or in a series/parallel arrangement, in which case the current and potential difference data collected by vehicle data collector 808 may include current and potential difference information for each cell, or for groups of cells within the main battery.

Resource consumption information may also include flags, signals, or other indicators indicating whether and to what extent particular subsystems or accessories are active from interior sensors 337 as illustrated in FIGS. 3A and 3B for example. As stated previously, interior sensors 337 may include environmental sensors, user interface sensors, safety sensors and sensors associated with various devices inside the vehicle 100 (e.g., smart phones, tablets, laptop computers, mobile computers, wearables, other charger or docking station, etc.). Besides collecting data related to the internal environment of vehicle 100 described in FIG. 3B above, environmental sensors sense conditions related to resource consumption information for the windshield wipers, air conditioner or heater, head lights, day time running lamps, radio or entertainment center, cigarette lighter, electric rear window defrosters, electric rear view mirror defrosters, seat heaters, or proximity, range finding, or anti-collision sensors. Vehicle data collector 808 may also receive individual current and/or voltage data indicating drain on the battery or overall power consumption of each of these accessories or subsystems.

Geospatial positional information including latitude and longitude of the vehicle 100 may be gathered by a location data collector 812 and written to data store 848. One example of location data collector 812 uses a GPS system such as GPS/Navigation sensor/system 308 illustrated in FIG. 3A which can operate together with a GPS enabled device (e.g., navigation source 356A, control source 356B or other entity 356N as illustrated in FIGS. 3A and 3C) coupled to location data collector 8 to provide updated location data. The GPS system including, antenna (such as GPS antenna/receiver 331 illustrated in FIG. 3O, radio transmitter, and or radio receiver (such as GPS antenna/receiver 331 illustrated in FIG. 3C), is integrated into vehicle 100 or the GPS system and radio transmitter/receiver are integrated into a single unit such as a cell phone, smart phone, or portable computer such as communication device 608 as illustrated in FIG. 6 which can be connected to location data collector 812 through a wired or wireless connection. Another example of location data collector 812 uses a radio transceiver to triangulate the position of vehicle 100 using radio signals such as from a cellular telephone network or similar source. These radio signals may be received and/or transmitted by a smart phone, cell phone, tablet computer, or similarly equipped cellular communication device capable of sending and/or receiving signals. For example, the user may dock or otherwise couple a smartphone to vehicle controller 804 and use the GPS features within the cell phone to obtain positional information.

Regardless of how the positional information is acquired, location data collector 812 acquires the positional data and writes the information to data store 848. Using this data, processor 836 can accurately model relationships between locations and resource consumption such as battery drain and fuel consumption. This information can be used to determine the distance to a next charging station for the vehicle 100 for example Positional information, as well as other data useful for adjusting regenerative braking intensity, may also be correlated to map data to further develop and refine the adjusted regenerative braking intensity calculations, Map data may be gathered by a map data collector 816 (which may be similar, if not identical, to map database 355 illustrated in FIG. 3C) and written to data store 848 where it can be accessed by the processor 836 and other modules within vehicle controller 804. One example of map data collector 816 obtains map information from remote computer systems such as remote computing devices 614 and 616 illustrated in FIG. 6. These remote computer systems 614 and 616 can include servers networked together using a computer network such as the Internet which may be coupled to the map data collector 816 using a wired or wireless network connection. For example, map data collector 816 may use an Internet connection made available by a smart phone, cellular phone, or other cellular enabled device such as a tablet or laptop computer coupled to vehicle control interface 844. Map data collector 816 may use the coupled device's cellular, Wi-Fi, or other computer network connection to obtain map information from remote computers 614 and 616.

Map data may include graphical representations for display to the user, using user interface 840 or computer code for processing by processor 836 or any other module within or connected to vehicle controller 804. The collected map data may include data representing nodes, locations, or destinations as well as paths with corresponding path locations. These locations may be stored by the remote computers 614 and 616 and provided to map data collector 816 over a wireless or wired network connection. User interface 840 may also be configured to accept user input defining nodes, paths, or additional information about a node or path provided from the remote computers 614 and 618 as well. This additional information may replace or be added to map data received from the remote source to provide aid in the prediction of resource consumption. The additional data about nodes or paths (whether provided by the user or by another system such as a third-party service such as a vehicle to vehicle service, a vehicle to another application service or cloud server service, etc.) may include data such as road elevation, road grade, type of road surface, number of lanes, direction of travel, the existence and arrangement, of traffic lights or other signals, a direction of travel permitted along the path, and whether traffic flow reverses along a given path or through a particular node at one time of day with respect to a second time of day (e.g. traffic flows west-bound during the mid-day and evening hours to move traffic out of town, and east-bound in the opposite direction in the morning to move traffic into town).

Map data may also include information about when particular traffic lights flash yellow in the direction of one path and flash red in the direction of the intersecting path during off peak-hours switching to operate in a four-way red-yellow-green pattern at other times. Also included may be data regarding whether traffic signals are triggered by the presence of vehicle traffic using a vehicle sensor triggered by vehicle proximity or weight, or are operated on a timer configured to control and coordinate a series of traffic signals to change signals in a sequence or pattern. Additional data may also include frequently traveled routes, or user selected preprogrammed routes. Nodes and paths may also include cost information such as whether a toll is collected at a particular node or collected after traversing a particular path.

Topographical data related to possible routes of travel is collected and stored in data store 848 by a topographical data collector 820. Topographical data is used by processor 836 to model changes in resource consumption based on significant variations in elevation along a route. Topographical data may be used in relation to map, vehicle, weather, and other data in data store 848 as well. For example, an electric vehicle will typically expend more energy driving up a long incline but may then reclaim some or all of that energy using regenerative braking on a down slope.

In one example, a topographical data collector 820 is connected to one or more sensors such as an altimeter or similar device operable to detect small changes in elevation. This type of data has the advantage of providing processor 836 with data that correlates to main battery fuel, or other energy usage over a particular route or route segment that can correspond to nodes and paths collected by the map data collector 816. One example of topographical data collector 820 retrieves topographical data for a given route as the road is traversed. Another example of topographical data collector 820 retrieves an initial set of topographical data from an external or remote data source such as a remote computer (614, 616) accessible via a wired or wireless computer network connection, Topographical data collector 820 may retrieve relevant topography data to preload the data store 848 with topographical information corresponding to the route chosen or the general area surrounding the chosen route or destination.

The topographical data collected may also include or consist of changes in altitude at one location relative to one or more other locations. The topographical data retrieved from a remote source may be included with map information retrieved using map data collector 816. Topographical data may also be stored and retrieved separately from map data retrieved or stored in data store 848. However, map data may be used by some embodiments of topographical data collector 820 to query a remote system (or data store 848) for specific topographical information to obtain data related to a route, a number of potential routes, or a geographical area including a route or a number of potential routes. These devices could either be connected to topographical data collector 820 or serve as the data collector themselves and be directly connected to data store 848.

Vehicle controller 804 can also collect weather data using a weather data collector 824. As with vehicle 100, location, and map data discussed above, weather data can be stored in data store 848 for analysis by processor 836 to adjust regenerative braking intensity caused by weather related phenomena. Pertinent weather data may include wind speed and direction, temperature, visibility, cloud cover, sunrise, sunset, and dew point. Whether data may also include precipitation information such as type of precipitation, and the amount of precipitation deposited over a predetermined period of time such as per minute, per hour, per day, and the like.

In one example, weather data collector 824 accesses weather data from one or more remote computer systems providing weather data from databases accessible through one or more wired or wireless networks such as the Internet. The wired or wireless network connection may be supplied by a mobile device such as a smart phone, laptop computer, and others as discussed above. Another example of weather data collector 824 supplements weather data accessed from a remote database such as computers 614 and 616 with sensor readings taken from vehicle sensors as the vehicle traverses a selected route. Examples of types of data that may be collected by vehicle sensors include, but are not limited to, temperature, air pressure, visibility, and humidity.

A traffic data collector 828 can collect traffic and road condition data and write it to data store 848 enabling processor 836 to make resource predictions based on traffic patterns and road conditions. One embodiment of traffic data collector 828 acquires traffic related information for the chosen route from a remote database accessible through a computer network such as the Internet and saves traffic data to data store 848 for analysis by processor 836. Traffic and road conditions may include the existence of temporary obstructions to the flow of traffic such as construction zones, utility work, lane restrictions, traffic accidents, emergencies, and the like. It may also include traffic flow rates where available indicating the rate at which traffic is traveling over a given segment of one or more routes or potential travel routes. As with other data collectors mentioned above such as topographical and whether data collectors, traffic data collector 828 may access location data and map data, and possibly other data as well, from data store 848 to query for traffic data specific to nodes or locations, and paths or segments along a proposed route. Another example of traffic data is data from various sensors such as cameras, LIDARs and radars which provide information regarding the existence of static and dynamic objects such as for example, other vehicles, pedestrians, road debris, lane lines, traffic signs and lights, buildings, cross walks, etc.

In another example, traffic data collector 828 reads positional data from data store 848 as the route is traversed and uses the positional information to calculate path, segment, or route timing information which can be stored in data store 848. In this way, route specific data can be created indicating areas where the average speed may change, or where traffic frequently stops and for how long. By repeatedly traversing substantially the same routes, traffic data collector 828 can develop data regarding traffic flow, number of stops, length of stops, average speed, and overall resources required for a given path, route segment, or route. In another example, traffic data collector 828 combines accessing traffic flow patterns from a remote database such as computers 614 and 618 with data collected over time.

History data collector 832 analyzes historical data to calculate the accuracy of the predictions made by processor 836. In one example, history data collector 832 analyzes the results of past predictions searching for anomalies in predictions on particular routes, or rote segments where the results are predictably incorrect for particular combinations of traffic, weather, vehicle, and topography variables. History collector 832 can also calculate and write to data store 848 a set of modifiers that can be applied by processor 836 to future predictions to reduce or eliminate the difference between the predicted results and the actual results. In another example, history data collector 832 increases the accuracy of resource prediction calculations performed by processor 836 by connecting to a remote server and uploading some or all of the data used by processor 836 to make resource predictions. This data can include values representing predicted resource consumption and actual resource consumption for a particular route, route segment, destination, or intermediate node or location. The data may include vehicle, location, map, topographical, and whether data, and any other data processed by processor 836. The remote servers (614, 616) may then process the data received and using it to develop or change algorithms used by processor 836 to change its functionality, preferably to reduce or eliminate differences between actual results for a given route and calculated predictions made by processor 836.

As a comparative example, scenario A uses standard regenerative braking intensity values. Based on the standard regenerative braking intensity values, if a vehicle travels down a roadway and regenerative braking is applied (i.e., the removal of a user's foot from the accelerator pedal) the vehicle will eventually stop 50 meters away from its present location for example. If another vehicle is provided in the pathway of the vehicle 45 meters away, for example, the vehicle would either hit the other vehicle or apply braking from the vehicle's friction braking system to avoid hitting the other vehicle. Conversely, scenario B uses adjusted regenerative braking intensity values, based on the detection of the other vehicle provided 45 meters away from and in the path of the current vehicle. With the adjusted regenerative braking intensity values, the vehicle will increase regenerative braking (which leads to the vehicle deaccelerating faster), generate electrical energy to be fed to the vehicle's batteries and eliminate the need to apply braking from the vehicle's friction braking system to avoid hitting the other vehicle.

Figure 9:
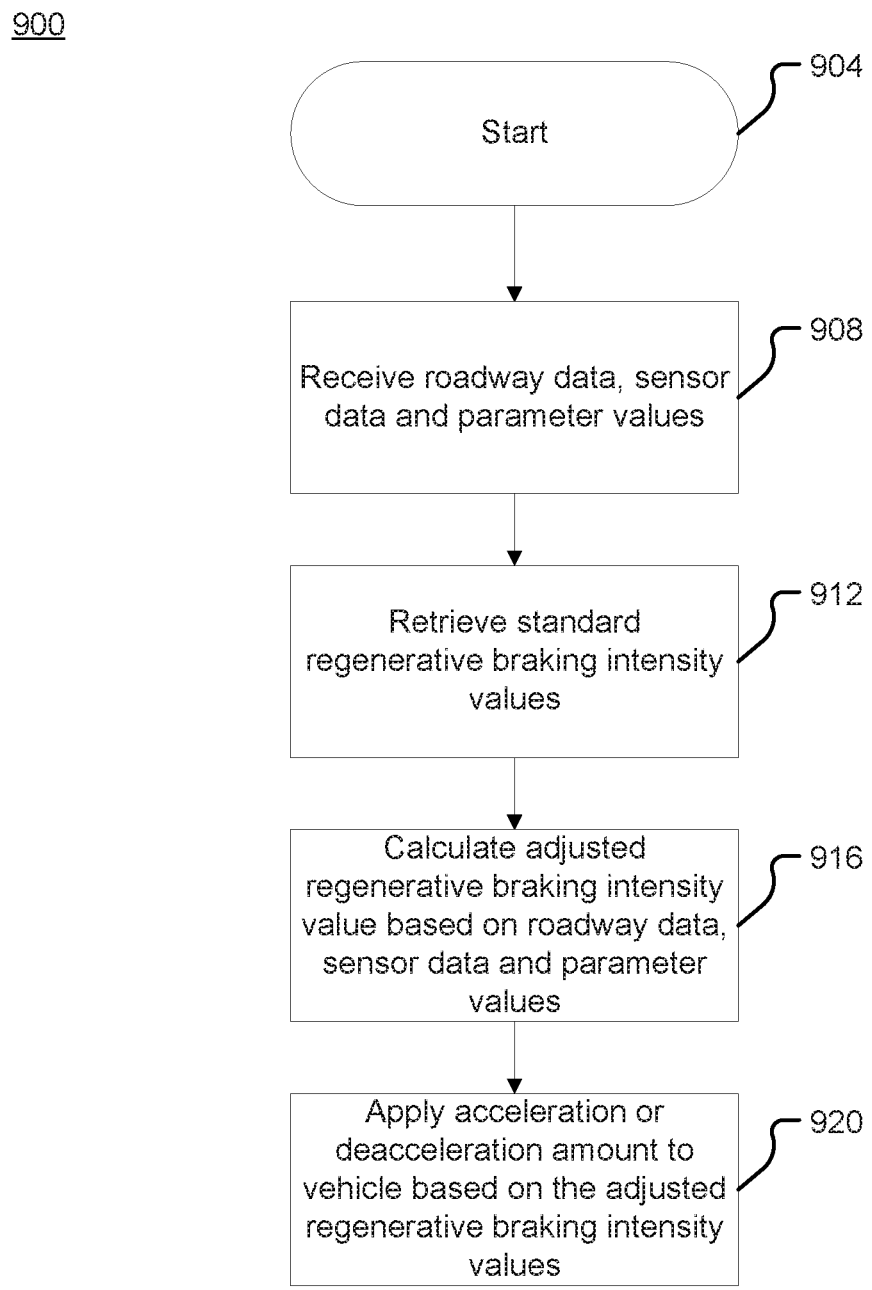
FIG. 9 is a flowchart illustrating an exemplary process for dynamically and automatically adjusting a standard regenerative braking intensity value according to embodiments of the present disclosure.

FIG. 9 is a flowchart illustrating an exemplary process 900 for dynamically and automatically adjusting standard regenerative braking intensity values according to embodiments of the present disclosure. As illustrated in this example, process 900 starts at block 904. At block 908, a control system of the vehicle, such as vehicle control system 348 and/or navigation system 302 described above, with the use of a processor such as sensor processor 340, or other device(s) such as for example processors 604, 614 and 618, computing device(s) 368 and/or CPU 708 receives roadway data, sensor data and parameter values. The roadway data may include, but not limited to, data received from the location data collector 812, the map data collector 816, the topographical data collector 820, the weather data collector 824, the traffic data collector 828, the history data collector 832 or other data collecting sources. The sensor data includes static and dynamic objects provided in and around the pathway of the vehicle including other vehicles, pedestrians, and/or other objects near, or proximal to, the vehicle 100. Moreover, sensor data includes, but is not limited to road debris, road markings such as lane lines, left turn lane lines, stop lines and crosswalks, traffic signals such as red, yellow, green and turn signals and lane use control signals, traffic signs such as warning signs, traffic control signs such as bicycle crossing signs, signal ahead signs, pedestrian crossing signs, school crossing signs, traffic flow signs such as speed advisory signs, added lane signs, begin divided roadway signs, end divide roadway signs, lane ends/merge left signs, turn signs, stop signs, yield signs, wrong way signs, lane control signs, speed limit signs, railroad crossing signs, work zone signs, guide signs, service signs and route signs. The parameter values for operating states of the vehicle include but are not limited to an operating state of a battery as a power energy source for driving of the vehicle, operating states of power electronics for operating the vehicle, an operating state of a motor as a power energy source of driving the vehicle, an operating state of the vehicle when the vehicle tows an object and an operating state of the vehicle when the vehicle is fully occupied with passengers. User preferences may also be included. At block 912, the standard regenerative braking intensity values based on a vehicle's acceleration are retrieved from memory. At block 916, the processor calculates adjusted regenerative braking intensity values based on at least one of the roadway data, the sensor data and the parameter values. The standard regenerative braking intensity values are also used to calculate the adjusted regenerative braking intensity values. At block 920, the control system applies an acceleration or deacceleration amount to the vehicle based on the adjusted regenerative braking intensity values without the use of the vehicle's friction braking system.

Any of the steps, functions, and operations discussed herein can be performed continuously and automatically.

The exemplary systems and methods of this disclosure have been described in relation to vehicle systems and electric vehicles. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

Embodiments include a method for adjusting an amount of regenerative braking, the method comprising receiving, by a processor of a control system of a vehicle, roadway data from a route being navigated by the vehicle, data from one or more sensors of the vehicle and data comprising parameter values for operating states of the vehicle and retrieving, by the processor, standard regenerative braking intensity values based on an acceleration of the vehicle. The method also includes calculating, by the processor, adjusted regenerative braking intensity values based on at least one of the roadway data, the sensor data and the parameter values of the operating states of the vehicle and the standard regenerative braking intensity values, transmitting, by the processor, the adjusted regenerative braking intensity values to the control system and applying, by the control system, an acceleration or deacceleration amount to the vehicle based on the adjusted regenerative braking intensity values.

Aspects of the above method include wherein the roadway data includes static information and dynamic information.

Aspects of the above method include wherein the static information includes at least one of map information of the route, terrain information of the route, historical traffic information of the route and speed information of the route.

Aspects of the above method include wherein the dynamic information includes at least one of weather information including temperature information, precipitation information and wind information and current traffic information of the route.

Aspects of the above method include wherein the roadway information is provided from a third-party service other than from the vehicle.

Aspects of the above method include wherein the parameter values for operating states of the vehicle include at least one of an operating state of a battery as a power energy source for driving the vehicle, operating states of power electronics for operating the vehicle, an operating state of a motor as a power energy source for driving the vehicle, an operating state of the vehicle when the vehicle tows an object and an operating state of the vehicle when the vehicle is fully occupied with passengers.

Aspects of the above method include further comprising receiving, by the processor, user preferences regarding the route being navigated by the vehicle and calculating, by the processor, the adjusted regenerative braking intensity values based on at least one of the roadway data, the sensor data, the parameter values of the operating states of the vehicle and the user preferences and the standard regenerative braking intensity values, wherein the user preferences are entered via a user interface.

Aspects of the above method include further comprising displaying for selection, by the user interface, at least one adjustment option including the adjusted regenerative braking intensity values.

Aspects of the above method include further comprising, receiving, by the user interface, a selection of the at least one adjustment option.

Aspects of the above method include further comprising applying, by the control system, the acceleration or deacceleration amount to the vehicle based on the selection of the at least one adjustment option.

Embodiments include a regenerative braking system, comprising one or more sensors sensing a route being navigated by a vehicle, a control system controlling regenerative braking of the vehicle and a processor in communication with the one or more sensors and the control system. The processor configured to receive roadway data from the route being navigated by the vehicle, sensor data from the one or more sensors and parameter values for operating states of the vehicle and retrieve standard regenerative braking intensity values based on an acceleration of the vehicle. The processor is also configured to calculate adjusted regenerative braking intensity values based on at least one of the roadway data, the sensor data and the parameter values of the operating states of the vehicle and the standard regenerative intensity values and transmit the adjusted regenerative braking intensity values to the control system to apply an acceleration or deacceleration amount to the vehicle to control regenerative braking based on the adjusted regenerative braking intensity values.

Aspects of the above regenerative braking system include wherein the roadway data includes static information and dynamic information.

Aspects of the above regenerative braking system include wherein the static information includes at least one of map information of the route, terrain information of the route, historical traffic information of the route and speed information of the route.

Aspects of the above regenerative braking system include wherein the dynamic information includes at least one of weather information including temperature information, precipitation information and wind information and current traffic information of the route.

Aspects of the above regenerative braking system include wherein the roadway information is provided from a third-party service other than from the vehicle.

Aspects of the above regenerative braking system include wherein the processor is further configured to receive user preferences regarding the route being navigated by the vehicle, calculate the adjusted regenerative braking intensity values based on at least one of the roadway data, the sensor data, the parameter values of the operating states of the vehicle and the user preferences and the standard regenerative braking intensity values, wherein the user preferences are entered via a user interface.

Aspects of the above regenerative braking system include wherein the processor provides instructions to display for selection at least one adjustment option including the adjusted regenerative braking intensity values.

Aspects of the above regenerative braking system include wherein the processor is further configured to receive a selection of the at least one adjustment option.

Aspects of the above regenerative braking system include wherein the acceleration or deacceleration amount to the vehicle is applied based on the selection of the at least one adjustment option.

Embodiments include a vehicle control system, comprising a processor and a memory coupled with and readable by the processor and storing therein a set of instructions, which when executed by the processor, cause the processor to adjust an amount of regenerative braking by receiving roadway data from a route being navigated by a vehicle, sensor data from one or more sensors and parameter values for operating states of the vehicle, retrieving standard regenerative braking intensity values based on an acceleration of the vehicle, calculating adjusted regenerative braking intensity values based on at least one of the roadway data, the sensor data and the parameter values of the operating states of the vehicle and the standard regenerative intensity values and transmitting the adjusted regenerative braking intensity values to the vehicle control system to apply an acceleration or deacceleration amount to the vehicle to control regenerative braking based on the adjusted regenerative braking intensity values.

Any one or more of the aspects/embodiments as substantially disclosed herein optionally in combination with any one or more other aspects/embodiments as substantially disclosed herein.

One or means adapted to perform any one or more of the above aspects/embodiments as substantially disclosed herein.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "electric vehicle" (EV), also referred to herein as an electric drive vehicle, may use one or more electric motors or traction motors for propulsion. An electric vehicle may be powered through a collector system by electricity from off-vehicle sources, or may be self-contained with a battery or generator to convert fuel to electricity. An electric vehicle generally includes a rechargeable electricity storage system (RESS) (also called Full Electric Vehicles (FEV)). Power storage methods may include: chemical energy stored on the vehicle in on-board batteries (e.g., battery electric vehicle or BEV), on board kinetic energy storage (e.g., flywheels), and/or static energy (e.g., by on-board double-layer capacitors). Batteries, electric double-layer capacitors, and flywheel energy storage may be forms of rechargeable on-board electrical storage.

The term "hybrid electric vehicle" refers to a vehicle that may combine a conventional (usually fossil fuel-powered) powertrain with some form of electric propulsion. Most hybrid electric vehicles combine a conventional internal combustion engine (ICE) propulsion system with an electric propulsion system (hybrid vehicle drivetrain). In parallel hybrids, the ICE and the electric motor are both connected to the mechanical transmission and can simultaneously transmit power to drive the wheels, usually through a conventional transmission. In series hybrids, only the electric motor drives the drivetrain, and a smaller ICE works as a generator to power the electric motor or to recharge the batteries. Power-split hybrids combine series and parallel characteristics. A full hybrid, sometimes also called a strong hybrid, is a vehicle that can run on just the engine, just the batteries, or a combination of both. A mid hybrid is a vehicle that cannot be driven solely on its electric motor, because the electric motor does not have enough power to propel the vehicle on its own.

The term "rechargeable electric vehicle" or "REV" refers to a vehicle with on board rechargeable energy storage, including electric vehicles and hybrid electric vehicles.

What is claimed is:

1. A method for adjusting an amount of regenerative braking, the method comprising:
  receiving, by a processor of a control system of a vehicle that is currently in operation, roadway data from a route being navigated by the vehicle that is currently in operation, sensor data from one or more sensors of the vehicle that is currently in operation and data comprising parameter values for operating states of the vehicle that is currently in operation;
  retrieving, by the processor, standard regenerative braking intensity values based on an acceleration of the vehicle that is currently in operation;
  calculating, by the processor, adjusted regenerative braking intensity values configured to be executed to the vehicle that is currently in operation based on at least one of the roadway data, the sensor data, the parameter values, and the standard regenerative braking intensity values;
  displaying for selection, by a user interface, various adjustment options for executing the calculated adjusted regenerative braking intensity values to the vehicle that is currently in operation;
  receiving, by the user interface, a selection of one of the various adjustment options for the adjusted regenerative braking intensity values;
  transmitting, by the processor, the selection of the one of the various adjustment options for the adjusted regenerative braking intensity values to the control system; and
  applying, by the control system, an acceleration or deacceleration amount to the vehicle that is currently in operation based on the selection of the one of the various adjustment options for the adjusted regenerative braking intensity values.

2. The method of claim 1, wherein the roadway data includes static information and dynamic information.

3. The method of claim 1, wherein the parameter values for operating states of the vehicle that is currently in operation include at least one of an operating state of the vehicle when the vehicle that is currently in operation tows an object and an operating state of the vehicle when the vehicle that is currently in operation is fully occupied with passengers.

4. The method of claim 1, further comprising:
  receiving, by the processor, user preferences regarding the route being navigated by the vehicle that is currently in operation.

5. The method of claim 1, further comprising:
  receiving, by the user interface, user preferences regarding the selection of the one of the various adjustment options for the adjusted regenerative braking intensity values; and
  generating, by the user interface, new adjustment options based on the user preferences.

6. The method of claim 1, wherein at least one of the roadway data and the parameter values comprises a prediction for the at least one of the roadway data and the parameter values and further comprising:
  determining, by the processor, an accuracy of the prediction for the at least one roadway data and the parameter values;
  based on the determined accuracy of the prediction, generating, by the processor, a set of modifiers to be applied to a future prediction for the at least one of the roadway data and the parameter values; and
  applying, by the processor, the set of modifiers to the future prediction to provide a modified prediction for the at least one of the roadway data and the parameter values that reduces a difference between the modified prediction and the at least one of the roadway data and the parameter values.

7. The method of claim 1, further comprising:
  determining, by the processor, a predicted resource consumption value for a corresponding actual resource consumption value associated with at least one of the roadway data and the parameter values;
  determining, by the processor, an accuracy for the predicted resource consumption value;
  based on the determined accuracy for the predicted resource consumption value, updating an algorithm to be applied to a future prediction for resource consumption value associated with the at least one of the roadway data and the parameter values; and
  applying the updated algorithm to the future prediction to provide a modified prediction that reduces a difference between the modified prediction and the corresponding actual resource consumption value associated with the at least one of the roadway data and the parameter values.

8. A regenerative braking system, comprising:
  one or more sensors sensing a route being navigated by a vehicle that is currently in operation;
  a control system controlling regenerative braking of the vehicle that is currently in operation; and a processor in communication with the one or more sensors and the control system, the processor configured to:

receive roadway data from the route being navigated by the vehicle that is currently in operation, sensor data from the one or more sensors and parameter values for operating states of the vehicle that is currently in operation;

retrieve standard regenerative braking intensity values based on an acceleration of the vehicle that is currently in operation;

calculate adjusted regenerative braking intensity values configured to be executed to the vehicle that is currently in operation based on at least one of the roadway data, the sensor data, parameter values, and the standard regenerative braking intensity values;

display for selection, various adjustment options for executing the calculated adjusted regenerative braking intensity values to the vehicle that is currently in operation;

receive a selection of one of the various adjustment options for the adjusted regenerative braking intensity values; and transmit the selection of the one of the various adjustment options for the adjusted regenerative braking intensity values to the control system to apply an acceleration or deacceleration amount to the vehicle that is currently in operation to control regenerative braking based on the selection of the one of the various adjustment options for the adjusted regenerative braking intensity values.

9. The regenerative braking system of claim 8, wherein the roadway data includes static information and dynamic information.

10. The regenerative braking system of claim 9, wherein the roadway data is provided from a third-party service other than from the vehicle that is currently in operation.

11. The regenerative braking system of claim 8, wherein the processor is further configured to:

receive user preferences regarding the route being navigated by the vehicle that is currently in operation.

12. The regenerative braking system of claim 8, wherein the parameter values for operating states of the vehicle that is currently in operation include at least one of an operating state of the vehicle when the vehicle that is currently in operation tows an object and an operating state of the vehicle when the vehicle that is currently in operation is fully occupied with passengers.

13. The regenerative braking system of claim 8, further comprising:

receiving user preferences regarding the selection of the one of the various adjustment options for the adjusted regenerative braking intensity values; and generating new adjustment options based on the user preferences.

14. The regenerative braking system of claim 8, wherein the at least one of the roadway data and the parameter values comprises a prediction for the at least one of the roadway data and the parameter values and wherein the processor is further configured to:

determine an accuracy of the prediction for the at least one of the roadway data and the parameter values;

based on the determined accuracy of the prediction, generate a set of modifiers to be applied to a future prediction for the at least one of the roadway data and the parameter values; and apply the set of modifiers to the future prediction to provide a modified prediction for the at least one of the roadway data and the parameter values that reduces a difference between the modified prediction and the at least one of the roadway data and the parameter values.

15. The regenerative braking system of claim 8, wherein the processor is further configured to:

determine a predicted resource consumption value for a corresponding actual resource consumption value associated with at least one of the roadway data and the parameter values;

determine an accuracy for the predicted resource consumption value;

based on the determined accuracy for the predicted resource consumption value, update an algorithm to be applied to a future prediction for resource consumption value associated with the at least one of the roadway data and the parameter values; and apply the updated algorithm to the future prediction to provide a modified prediction that reduces a difference between the modified prediction and the corresponding actual resource consumption value associated with the at least one of the roadway data and the parameter values.

16. A vehicle control system, comprising:

a processor; and a memory coupled with and readable by the processor and storing therein a set of instructions, which when executed by the processor, cause the processor to adjust an amount of regenerative braking by:

receiving roadway data from a route being navigated by a vehicle that is currently in operation, sensor data from one or more sensors and parameter values for operating states of the vehicle that is currently in operation;

retrieving standard regenerative braking intensity values based on an acceleration of the vehicle that is currently in operation;

calculating adjusted regenerative braking intensity values configured to be executed to the vehicle that is currently in operation based on at least one of the roadway data, the sensor data, parameter values, and the standard regenerative braking intensity values to the vehicle that is currently in operation;

displaying for selection, various adjustment options, for executing the calculated adjusted regenerative braking intensity values to the vehicle that is currently in operation;

receiving a selection of one of the various adjustment options for the adjusted regenerative braking intensity values; and transmitting the selection of the one of the various adjustment options for the adjusted regenerative braking intensity values to the vehicle control system to apply an acceleration or deacceleration amount to the vehicle that is currently in operation to control regenerative braking based on the selection of the one of the various adjustment options for the adjusted regenerative braking intensity values.

17. The vehicle control system of claim 16, wherein the parameter values for operating states of the vehicle that is currently in operation include at least one of an operating state of the vehicle when the vehicle that is currently in operation tows an object and an operating state of the vehicle when the vehicle that is currently in operation is fully occupied with passengers.

18. The vehicle control system of claim 16, further comprising:
receiving user preferences regarding the selection of the one of the various adjustment options for the adjusted regenerative braking intensity values; and
generating new adjustment options based on the user preferences.

19. The vehicle control system of claim 16, wherein at least one of the roadway data and the parameter values comprises a prediction for the at least one of the roadway data and the parameter values and wherein the processor is further caused to adjust an amount of regenerative braking by:
determining an accuracy of the prediction for the at least one roadway data and the parameter values;
based on the determined accuracy of the prediction, generating a set of modifiers to be applied to a future prediction for the at least one of the roadway data and the parameter values; and
applying the set of modifiers to the future prediction to provide a modified prediction for the at least one of the roadway data and the parameter values that reduces a difference between the modified prediction and the at least one of the roadway data and the parameter values.

20. The vehicle control system of claim 16, wherein the processor is further caused to adjust an amount of regenerative braking by:
determining a predicted resource consumption value for a corresponding actual resource consumption value associated with at least one of the roadway data and the parameter values;
determining an accuracy for the predicted resource consumption value;
based on the determined accuracy for the predicted resource consumption value, updating an algorithm to be applied to a future prediction for resource consumption value associated with the at least one of the roadway data and the parameter values; and
applying the updated algorithm to the future prediction to provide a modified prediction that reduces a difference between the modified prediction and the corresponding actual resource consumption value associated with the at least one of the roadway data and the parameter values.

\* \* \* \* \*